(12) United States Patent
Price et al.

(10) Patent No.: US 11,676,279 B2
(45) Date of Patent: Jun. 13, 2023

(54) UTILIZING A SEGMENTATION NEURAL NETWORK TO PROCESS INITIAL OBJECT SEGMENTATIONS AND OBJECT USER INDICATORS WITHIN A DIGITAL IMAGE TO GENERATE IMPROVED OBJECT SEGMENTATIONS

(71) Applicant: Adobe Inc., San Jose, CA (US)

(72) Inventors: Brian Price, Draper, UT (US); Su Chen, San Jose, CA (US); Shuo Yang, Bloomington, IN (US)

(73) Assignee: Adobe Inc., San Jose, CA (US)

( * ) Notice: Subject to any disclaimer, the term of this patent is extended or adjusted under 35 U.S.C. 154(b) by 63 days.

(21) Appl. No.: 17/126,986

(22) Filed: Dec. 18, 2020

(65) Prior Publication Data
US 2022/0198671 A1 Jun. 23, 2022

(51) Int. Cl.
*G06K 9/00* (2022.01)
*G06T 7/11* (2017.01)
(Continued)

(52) U.S. Cl.
CPC ............... *G06T 7/11* (2017.01); *G06N 3/045* (2023.01); *G06N 3/088* (2013.01); *G06T 7/136* (2017.01);
(Continued)

(58) Field of Classification Search
CPC ........................................................ G06T 7/11
See application file for complete search history.

(56) References Cited

U.S. PATENT DOCUMENTS 7,295,700 B2 11/2007 Schiller et al.
7,606,417 B2 10/2009 Steinberg et al.
(Continued)

FOREIGN PATENT DOCUMENTS

CN 106339591 A 1/2017
CN 107103315 A 8/2017
(Continued)

OTHER PUBLICATIONS

Li et al., Interactive Image Segmentation with Latent Diversity, 2018, IEEE 2575-7075/18, DOI 10.11/09/CVPR. 2018.00067, pp. 577-585. (Year: 2018).
(Continued)

*Primary Examiner* — Hadi Akhavannik
(74) *Attorney, Agent, or Firm* — Keller Preece PLLC

(57) ABSTRACT

The present disclosure relates to systems, non-transitory computer-readable media, and methods that utilize a deep neural network to process object user indicators and an initial object segmentation from a digital image to efficiently and flexibly generate accurate object segmentations. In particular, the disclosed systems can determine an initial object segmentation for the digital image (e.g., utilizing an object segmentation model or interactive selection processes). In addition, the disclosed systems can identify an object user indicator for correcting the initial object segmentation and generate a distance map reflecting distances between pixels of the digital image and the object user indicator. The disclosed systems can generate an image-interaction-segmentation triplet by combining the digital image, the initial object segmentation, and the distance map. By processing the image-interaction-segmentation triplet utilizing the segmentation neural network, the disclosed systems can provide an updated object segmentation for display to a client device.

20 Claims, 15 Drawing Sheets

(51) Int. Cl.
*G06T 7/143* (2017.01)
*G06T 7/136* (2017.01)
*G06T 7/162* (2017.01)
*G06T 7/90* (2017.01)
*G06N 3/088* (2023.01)
*G06N 3/045* (2023.01)

(52) U.S. Cl.
CPC .............. *G06T 7/143* (2017.01); *G06T 7/162* (2017.01); *G06T 7/90* (2017.01); *G06T 2200/24* (2013.01); *G06T 2207/20072* (2013.01); *G06T 2207/20076* (2013.01); *G06T 2207/20081* (2013.01); *G06T 2207/20084* (2013.01); *G06T 2207/20092* (2013.01)

(56) References Cited

U.S. PATENT DOCUMENTS

| | | |
|---|---|---|
| 7,916,917 B2 | 3/2011 | Dewaele et al. |
| 8,600,143 B1 | 12/2013 | Kulkarni et al. |
| 8,675,934 B2 | 3/2014 | Wehnes et al. |
| 9,251,429 B2 | 2/2016 | Pham et al. |
| 9,418,319 B2 | 8/2016 | Shen et al. |
| 9,495,756 B2 | 11/2016 | Rivet-Sabourin |
| 9,684,967 B2 | 6/2017 | Abedini et al. |
| 10,192,129 B2 | 1/2019 | Price et al. |
| 10,210,613 B2 | 2/2019 | Xu et al. |
| 10,460,214 B2 | 10/2019 | Lu et al. |
| 10,470,510 B1 | 11/2019 | Koh et al. |
| 10,643,331 B2 | 5/2020 | Ghesu et al. |
| 10,679,046 B1 | 6/2020 | Black et al. |
| 10,846,566 B2 | 11/2020 | Zhu et al. |
| 11,335,004 B2 | 5/2022 | Liu et al. |
| 2001/0051852 A1 | 12/2001 | Sundaravel et al. |
| 2003/0081833 A1 | 5/2003 | Tilton |
| 2004/0042662 A1 | 3/2004 | Wilensky et al. |
| 2004/0190092 A1 | 9/2004 | Silverbrook et al. |
| 2004/0202368 A1 | 10/2004 | Lee et al. |
| 2006/0045336 A1 | 3/2006 | Lim |
| 2006/0285743 A1* | 12/2006 | Oh .......................... G06V 10/26 382/199 |
| 2007/0165949 A1 | 7/2007 | Sinop et al. |
| 2009/0252429 A1 | 10/2009 | Prochazka et al. |
| 2010/0183225 A1 | 7/2010 | Vantaram et al. |
| 2010/0226566 A1 | 9/2010 | Luo et al. |
| 2010/0322488 A1 | 12/2010 | Virtue et al. |
| 2011/0188720 A1 | 8/2011 | Narayanan et al. |
| 2011/0216975 A1 | 9/2011 | Rother et al. |
| 2011/0285874 A1 | 11/2011 | Showering et al. |
| 2012/0201423 A1 | 8/2012 | Onai et al. |
| 2014/0010449 A1 | 1/2014 | Haaramo et al. |
| 2014/0056472 A1 | 2/2014 | Gu |
| 2014/0334667 A1 | 11/2014 | Eswara et al. |
| 2015/0117783 A1 | 4/2015 | Lin et al. |
| 2015/0269427 A1 | 9/2015 | Kim et al. |
| 2016/0232425 A1 | 8/2016 | Huang et al. |
| 2017/0032551 A1 | 2/2017 | Fried et al. |
| 2017/0116497 A1 | 4/2017 | Georgescu et al. |
| 2017/0140236 A1* | 5/2017 | Price .................... G06N 3/0454 |
| 2017/0169313 A1 | 6/2017 | Choi et al. |
| 2017/0169567 A1 | 6/2017 | Chefd'hotel et al. |
| 2017/0213349 A1 | 7/2017 | Kuo et al. |
| 2017/0231550 A1 | 8/2017 | Do et al. |
| 2017/0244908 A1 | 8/2017 | Flack et al. |
| 2017/0249739 A1 | 8/2017 | Kallenberg et al. |
| 2017/0287137 A1 | 10/2017 | Lin et al. |
| 2018/0061046 A1 | 3/2018 | Bozorgtabar et al. |
| 2018/0108137 A1 | 4/2018 | Price et al. |
| 2018/0137335 A1 | 5/2018 | Kim et al. |
| 2018/0182101 A1 | 6/2018 | Petersen et al. |
| 2018/0240243 A1 | 8/2018 | Kim et al. |
| 2019/0057507 A1 | 2/2019 | El-Khamy et al. |
| 2019/0108414 A1 | 4/2019 | Price et al. |
| 2019/0236394 A1 | 4/2019 | Price et al. |
| 2019/0130229 A1 | 5/2019 | Lu et al. |
| 2019/0340462 A1* | 11/2019 | Pao ........................ G06T 3/4053 |
| 2019/0357615 A1 | 11/2019 | Koh et al. |
| 2020/0143194 A1 | 5/2020 | Hou et al. |
| 2020/0167930 A1* | 5/2020 | Wang .................... G06T 7/0012 |
| 2020/0388071 A1 | 12/2020 | Grabner et al. |
| 2021/0027098 A1 | 1/2021 | Ge et al. |
| 2021/0082118 A1 | 3/2021 | Zhang et al. |
| 2021/0217178 A1 | 7/2021 | Terzopoulos et al. |
| 2021/0248748 A1 | 8/2021 | Turgutlu et al. |
| 2021/0290096 A1 | 9/2021 | Yang |
| 2021/0295507 A1 | 9/2021 | Nie |
| 2022/0044366 A1 | 2/2022 | Zhang et al. |
| 2022/0044407 A1 | 2/2022 | Liu et al. |
| 2022/0108454 A1 | 4/2022 | Tsai et al. |
| 2022/0237799 A1 | 7/2022 | Price et al. |
| 2022/0262009 A1 | 8/2022 | Yu et al. |
| 2022/0292684 A1 | 9/2022 | Wang et al. |
| 2022/0375079 A1 | 11/2022 | Finley et al. |

FOREIGN PATENT DOCUMENTS

| | | |
|---|---|---|
| DE | 102015207047 A1 | 10/2015 |
| WO | WO 2015177268 A1 | 11/2015 |
| WO | WO 2018/229490 A1 | 12/2018 |

OTHER PUBLICATIONS

Xu et al., Deep Interactive Object Selection, Mar. 13, 2016 arXiv:1603.04042v1 [cs.CV], pp. 1-9. (Year: 2016).

U.S. Appl. No. 15/967,928, dated May 13, 2021, Office Action.

U.S. Appl. No. 16/231,746, dated Jun. 11, 2021, 1st Action Office Action.

Examination Report as received in Australian application 2019250107 dated Oct. 14, 2021.

U.S. Appl. No. 15/967,928, dated Sep. 29, 2021, Notice of Allowance.

U.S. Appl. No. 16/988,408, dated Oct. 5, 2021, Preinterview 1st Office Action.

X. Bai and G. Sapiro. Geodesic matting: A framework for fast interactive image and video segmentation and matting. International Journal of Computer Vision, 82(2):113-132, 2008.

Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.

L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.

R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.

L. Grady. Random walks for image segmentation. Pattern Analysis and Machine Intelligence, IEEE Transactions on, 28(11):1768-1783, 2006.

V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.

G. Lin, C. Shen, I. Reid, et al. Efficient piecewise training of deep structured models for semantic segmentation. arXiv preprint arXiv:1504.01013, 2015.

Z. Liu, X. Li, P. Luo, C. C. Loy, and X. Tang. Semantic image segmentation via deep parsing network. arXiv preprint arXiv:1509.02634, 2015.

J. Long, E. Shelhamer, and T. Darrell. Fully convolutional networks for semantic segmentation. arXiv preprint arXiv:1411.4038, 2014.

B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.

C. Rother, V. Kolmogorov, and A. Blake. Grabcut: Interactive foreground extraction using iterated graph cuts. ACM Transactions on Graphics (TOG), 23(3):309-314, 2004.

(56) References Cited

OTHER PUBLICATIONS

S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.
Roth, H.—"DeepOrgan: Multi-level Deep Convolutional Networks for Automated Pancreas Segmentation"—Jun. 22, 2015—arXiv:1506. 06448v1, pp. 1-12.
Wang, N.—"Transferring Rich Feature Hierarchies for Robust Visual Tracking"—Apr. 23, 2015—arXiv:1501.04587v2, pp. 1-9.
Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.
D. Acuna, H. Ling, A. Kar, and S. Fidler. Efficient interactive annotation of segmentation datasets with Polygon-RNN++. In CVPR, 2018.
D. Batra, P. Yadollahpour, A. Guzman-Rivera, and G. Shakhnarovich. Diverse m-best solutions in markov random fields. In ECCV, 2012.
L. Castrejon, K. Kundu, R. Urtasun, and S. Fidler. Annotating object instances with a polygon-rnn. In IEEE CVPR, Jul. 2017.
L.-C. Chen, Y. Zhu, G. Papandreou, F. Schroff, and H. Adam. Encoder-decoder with atrous separable convolution for semantic image segmentation. arXiv preprint arXiv:1802.02611, 2018.
A. Criminisi, T. Sharp, and A. Blake. GeoS: Geodesic image segmentation. In ECCV, pp. 99-112, 2008.
M. Everingham, L. Van Gool, C. K. Williams, J. Winn, and A. Zisserman. The pascal visual object classes (VOC) challenge. IJCV, 88(2):303-338, 2010.
M. Firman, N. D. F. Campbell, L. Agapito, and G. J. Brostow. Diversenet: When one right answer is not enough. In IEEE CVPR, Jun. 2018.
D. Freedman and T. Zhang. Interactive graph cut based segmentation with shape priors. In IEEE CVPR, vol. 1, pp. 755-762. IEEE, 2005.
A. Guzman-rivera, D. Batra, and P. Kohli. Multiple choice learning: Learning to produce multiple structured outputs. In F. Pereira, C. J. C. Burges, L. Bottou, and K. Q. Weinberger, editors, NIPS, pp. 1799-1807. 2012.
B. Hariharan, P. Arbelaez, L. Bourdev, S. Maji, and J. Malik. Semantic contours from inverse detectors. 2011.
K. He, X. Zhang, S. Ren, and J. Sun. Deep residual learning for image recognition. In IEEE CVPR, Jun. 2016.
Y. Hu, A. Soltoggio, R. Lock, and S. Carter. A fully convolutional two-stream fusion network for interactive image segmentation. Neural Networks, 109:31-42, 2019.
M. Kass, A. Witkin, and D. Terzopoulos. Snakes: Active contour models. IJCV, 1(4):321-331, 1988.
H. Le, L. Mai, B. Price, S. Cohen, H. Jin, and F. Liu. Interactive boundary prediction for object selection. In ECCV, Sep. 2018.
S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.
S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.
Y. Li, J. Sun, C.-K. Tang, and H.-Y. Shum. Lazy snapping. In ACM Transactions on Graphics, vol. 23, pp. 303-308, 2004.
Z. Li, Q. Chen, and V. Koltun. Interactive image segmentation with latent diversity. In IEEE CVPR, pp. 577-585, 2018.
J. H. Liew, Y. Wei, W. Xiong, S.-H. Ong, and J. Feng. Regional interactive image segmentation networks. In IEEE ICCV, Oct. 2017.
S. Mahadevan, P. Voigtlaender, and B. Leibe. Iteratively trained interactive segmentation. arXiv preprint arXiv:1805.04398, 2018.
K. Maninis, S. Caelles, J. Pont-Tuset, and L. Van Gool. Deep extreme cut: From extreme points to object segmentation. In IEEE CVPR, 2018.
K. McGuinness and N. E. OConnor. Toward automated evaluation of interactive segmentation. Computer Vision and Image Understanding, 115(6):868-884, 2011.
E. N. Mortensen and W. A. Barrett. Intelligent scissors for image composition. In Proceedings of the 22nd annual conference on Computer graphics and interactive techniques, pp. 191-198, 1995.
J. Redmon, S. Divvala, R. Girshick, and A. Farhadi. You only look once: Unified, real-time object detection. In Proceedings of the IEEE conference on computer vision and pattern recognition, pp. 779-788, 2016.
S. Ren, K. He, R. Girshick, and J. Sun. Faster r-cnn: Towards real-time object detection with region proposal networks. In Advances in neural information processing systems, pp. 91-99, 2015.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.
S. Vicente, V. Kolmogorov, and C. Rother. Graph cut based image segmentation with connectivity priors. In IEEE CVPR, pp. 1-8. IEEE, 2008.
N. Xu, B. Price, S. Cohen, J. Yang, and T. S. Huang. Deep interactive object selection. In IEEE CVPR, pp. 373-381, 2016.
K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.
B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.
Everingham, M. and VanGool, L. and Williams, C. K. I. and Winn, J. and Zisserman, A.; "The PASCAL Visual Object Classes Challenge 2007," (VOC2007) Results, Nov. 8, 2007, available at http://host.robots.ox.ac.uk/pascal/VOC/voc2007/.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405. 0312v3 [cs.CV], 15 pages.
Gao Huang, Zhuang Liu, Kilian Q. Weinberger, and Laurens V.D. Maaten; "Densely connected convolutional networks," In arXiv:1608. 06993v3, 2016.
C. Szegedy, W. Liu, Y.Q. Jia, P. Sermanet, S. Reed, D. Anguelov, D. Erhan, V. Vanhoucke, and A. Rabinovich; "Going deeper with convolutions," In CVPR , 2015.
Chen et al, 'DISC: Deep Image Saliency Computing via Progressive Representation Learning', 2016, IEEE Transactions on Neural Networks and Learning Systems, vol. 27, No. 6, pp. 1135-1149 (Year: 2016).
Control Theory and Informatics, vol. 2, No. 1, 2012 Digital Image Processing for Camera Application in Mobile Devices using Artificial Neural Networks, Kamat, S. P., pp. 11-17.
IEEE Conference on Computer Vision and Pattern Recognition (CVPR), 2016, Liang Chieh Chen et al., "Attention to Scale: Scale-Aware Semantic Image Segmentation", pp. 3640-3649 abstract 1. 7-9 and p. 2 left column, 1st paragraph starting at "In particular . . . ", 1.4-7, Sec. 3.1, Fig. 5 column (c).
IEEE/CVF International Conference on Computer Vision (ICCV), 2019, Liew Jun Hao et al, "MultiSeg: Semantically Meaningful, Scale-Diverse Segmentations From Minimal User Input", pp. 662-670 the whole document.
Chen, Liang-Chieh et al. "Rethinking Atrous Convolution for Semantic Image Segmentation." ArXiv abs/1706.05587 (2017): n. pag.
M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.
Combined Search and Examination Report as received in UK application GB1915436.8 dated Aug. 12, 2020.
Combined Search & Examination Report as received in UK application GB1813276.1 dated Feb. 14, 2019.
U.S. Appl. No. 14/945,245, dated Sep. 21, 2017, Preinterview 1st Office Action.

(56) References Cited

OTHER PUBLICATIONS

U.S. Appl. No. 14/945,245, dated Nov. 1, 2017, 1st Action Office Action.
U.S. Appl. No. 14/945,245, dated Apr. 17, 2018, Office Action.
U.S. Appl. No. 14/945,245, dated Sep. 12, 2018, Notice of Allowance.
U.S. Appl. No. 15/799,395, dated Mar. 14, 2019, Office Action.
U.S. Appl. No. 15/799,395, dated Jul. 12, 2019, Notice of Allowance.
U.S. Appl. No. 15/967,928, dated Dec. 10, 2020, Preinterview 1st Office Action.
Guo, Z.—"Deep Learning-Based Image Segmentation on Multimodal Medical Imaging" —IEEE—Mar. 1, 2019—pp. 162-169 (Year: 2019).
Wang, G.—"Interactive Medical Image Segmentation using Deep Learning with Image-specific Fine-tuning"—arxiv—Oct. 11, 2017—pp. 1-11 (Year: 2017).
Guo, Z.—"Medical Image Segmentation Based on Multi-Modal Convolutional Neural Network: Study on Image Fusion Schemes" —arXiv—Nov. 2, 2017—pp. 1-10 (Year: 2017).
U.S. Appl. No. 16/216,739, dated Dec. 23, 2021, Notice of Allowance.
U.S. Appl. No. 16/988,408, dated Jan. 5, 2022, Notice of Allowance.
U.S. Appl. No. 16/376,704, dated Dec. 29, 2021, Preinterview 1st Office Action.
U.S. Appl. No. 16/376,704, dated Feb. 7, 2022, 1st Action Office Action.
Notice of Grant as received in Australian application 2019250107 dated Mar. 17, 2022.
Ali Borji, Ming-Ming Cheng, Qibin Hou, Huaizu Jiang, and Jia Li. Salient object detection: A survey. Computational visual media, pp. 1-34, 2019.
Ali Borji and Laurent Itti. State-of-the-art in visual attention modeling. IEEE transactions on pattern analysis and machine intelligence, 35(1):185-207, 2012.
Liang-Chieh Chen, George Papandreou, Iasonas Kokkinos, Kevin Murphy, and Alan L Yuille. Semantic image segmentation with deep convolutional nets and fully connected crfs. arXiv preprint arXiv:1412.7062, 2014.
Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.
Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.
Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In Proceedings of the IEEE International Conference on Computer Vision, pp. 1314-1324, 2019.
Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.
Laurent Itti, Christof Koch, and Ernst Niebur. A model of saliency-based visual attention for rapid scene analysis. IEEE Transactions on pattern analysis and machine intelligence, 20(11):1254-1259, 1998.
Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.
Dominik A Klein and Simone Frintrop. Center-surround divergence of feature statistics for salient object detection. In 2011 International Conference on Computer Vision, pp. 2214-2219. IEEE, 2011.
Philipp Krahenbuhl and Vladlen Koltun. Efficient inference in fully connected crfs with gaussian edge potentials. In Advances in neural information processing systems, pp. 109-117, 2011.
Alex Krizhevsky, Ilya Sutskever, and Geoffrey E Hinton. Imagenet classification with deep convolutional neural networks. In Advances in neural information processing systems, pp. 1097-1105, 2012.
Guanbin Li and Yizhou Yu. Visual saliency based on multi-scale deep features. In Proceedings of the IEEE conference on computer vision and pattern recognition, pp. 5455-5463, 2015.
Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.
Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.
Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.
Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.
Nian Liu and Junwei Han. Dhsnet: Deep hierarchical saliency network for salient object detection. In Proceedings of the IEEE Conference on Computer Vision and Pattern Recognition, pp. 678-686, 2016.
Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.
Jonathan Long, Evan Shelhamer, and Trevor Darrell. Fully convolutional networks for semantic segmentation. In Proceedings of the IEEE conference on computer vision and pattern recognition, pp. 3431-3440, 2015.
Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.
Robert Osserman et al. The isoperimetric inequality. Bulletin of the American Mathematical Society, 84(6):1182-1238, 1978.
Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.
Chao Peng, Xiangyu Zhang, Gang Yu, Guiming Luo, and Jian Sun. Large kernel matters-improve semantic segmentation by global convolutional network. In Proceedings of the IEEE conference on computer vision and pattern recognition, pp. 4353-4361, 2017.
Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.
Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.
Jianping Shi, Qiong Yan, Li Xu, and Jiaya Jia. Hierarchical image saliency detection on extended cssd. IEEE transactions on pattern analysis and machine intelligence, 38(4):717-729, 2015.
Karen Simonyan and Andrew Zisserman. Very deep convolutional networks for large-scale image recognition. arXiv preprint arXiv:1409.1556, 2014.

(56) References Cited

OTHER PUBLICATIONS

Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.
Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.
Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.
Yichen Wei, Fang Wen, Wangjiang Zhu, and Jian Sun. Geodesic saliency using background priors. In European conference on computer vision, pp. 29-42. Springer, 2012.
Ning Xu, Brian Price, Scott Cohen, and Thomas Huang. Deep image matting. In Proceedings of the IEEE Conference on Computer Vision and Pattern Recognition, pp. 2970-2979, 2017.
Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.
Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.
Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.
Jianming Zhang and Stan Sclaroff. Saliency detection: A boolean map approach. In Proceedings of the IEEE international conference on computer vision, pp. 153-160, 2013.
Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.
Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.
Lihe Zhang, Chuan Yang, Huchuan Lu, Xiang Ruan, and Ming-Hsuan Yang. Ranking saliency. IEEE transactions on pattern analysis and machine intelligence, 39(9):1892-1904, 2016.
Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.
Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.
Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.
Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.
Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.
Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015.
Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.
L. Grady. Random walks for image segmentation. Pattern Analysis and Machine Intelligence, IEEE Transactions on, 28(11):1768-1783, 2006. Part 1.
L. Grady. Random walks for image segmentation. Pattern Analysis and Machine Intelligence, IEEE Transactions on, 28(11):1768-1783, 2006. Part 2.
Zhang et al. in U.S. Appl. No. 16/988,055, filed Aug. 7, 2020, entitled Generating an Image Mask for a Digital Image by Utilizing a Multi-Branch Masking Pipeline With Neural Networks.
U.S. Appl. No. 16/216,739, dated Feb. 25, 2021, Preinterview 1st Office Action.
U.S. Appl. No. 16/216,739, dated Apr. 5, 2021, 1st Action Office Action.
U.S. Appl. No. 15/967,928, dated Apr. 2, 2021, 1st Action Office Action.
U.S. Appl. No. 16/231,746, dated Feb. 18, 2021, Preinterview 1st Office Action.
Intention to Grant as received in UK application GB1915436.8 dated Aug. 25, 2021.
U.S. Appl. No. 16/216,739, dated Sep. 13, 2021, Office Action.
Examination Report as received in Australian application 2019250107 dated Nov. 5, 2021.
Notice of Grant as received in UK application GB1813276.1 dated Oct. 12, 2021.
U.S. Appl. No. 16/231,746, dated Nov. 10, 2021, Notice of Allowance.
U.S. Appl. No. 16/988,408, dated Nov. 24, 2021, 1st Action Office Action.
U.S. Appl. No. 16/376,704, dated Jun. 14, 2022, Office Action.
U.S. Appl. No. 16/376,704, dated Oct. 4, 2022, Notice of Allowance.
U.S. Appl. No. 17/660,361, dated Dec. 8, 2022, Office Action.
Wang, Y., Zhao, X., Li, Y., & Huang, K. (2018). Deep crisp boundaries: From boundaries to higher-level tasks. IEEE Transactions on Image Processing, 28(3), 1285-1298. (Year: 2018).
Le, T., & Duan, Y. (2020). REDN: a recursive encoder-decoder network for edge detection. IEEE Access, 8, 90153-90164. (Year: 2020).
Zhao, H., Shi, J., Qi, X., Wang, X., & Jia, J. (2017). Pyramid scene parsing network. In Proceedings of the IEEE conference on computer vision and pattern recognition (pp. 2881-2890). (Year: 2017).
Cheng, Ho & Chung, Jihoon & Tai, Yu-Wing & Tang, Chi-Keung. (2020). CascadePSP: Toward Class-Agnostic and Very High-Resolution Segmentation via Global and Local Refinement. arXiv:2005.02551v1 [cs.CV] May 6, 2020.
U.S. Appl. No. 17/660,361, dated Mar. 28, 2023, Notice of Allowance.
U.S. Appl. No. 17/200,525, dated Mar. 6, 2023, Office Action.
Office Action as received in CN application 201810886944.1 dated Apr. 8, 2023.

\* cited by examiner

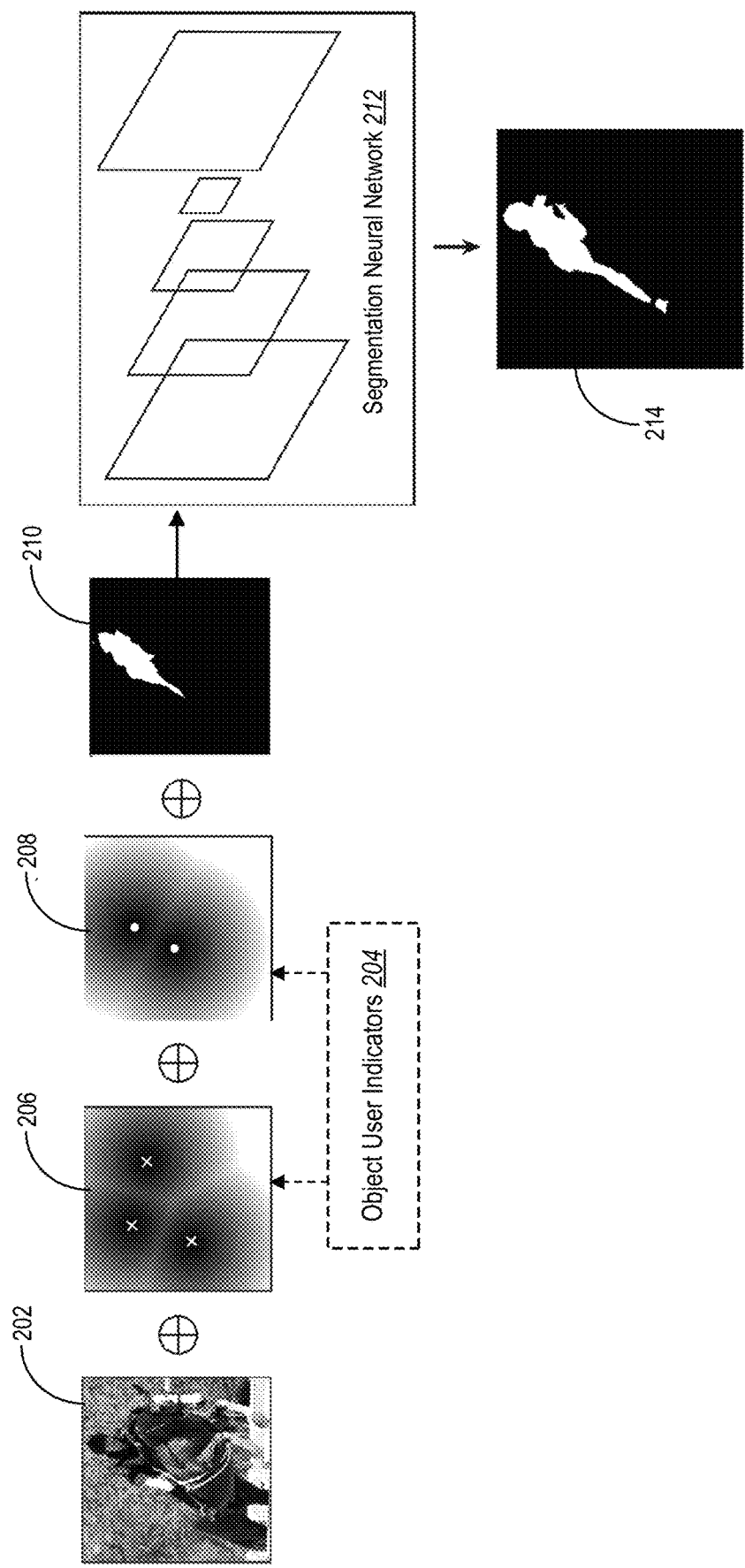

Object Segmentation System Result

Conventional System Result

UTILIZING A SEGMENTATION NEURAL NETWORK TO PROCESS INITIAL OBJECT SEGMENTATIONS AND OBJECT USER INDICATORS WITHIN A DIGITAL IMAGE TO GENERATE IMPROVED OBJECT SEGMENTATIONS

BACKGROUND

Recent years have seen a rapid proliferation in the use of digital visual media. Indeed, with advancements in digital cameras, smartphones, and other technology, the ability to capture, access, and utilize digital images and video has steadily increased. Accordingly, engineers have made significant developments in digital object selection systems that capture, manage, and edit digital images. For example, some conventional object selection systems can identify and select objects portrayed within digital images. To illustrate, some common digital object selection systems detect user tracing of an area within a digital image and select pixels within the traced area. Other digital object selection systems can employ predictive methods to automatically generate a predicted object selection based on the user input. Despite these improvements, conventional systems continue to suffer from a number technical deficiencies with regard to accuracy, efficiency, and flexibility of implementing computing systems.

BRIEF SUMMARY

Embodiments of the present disclosure provide benefits and/or solve one or more of the foregoing or other problems in the art with systems, non-transitory computer-readable media, and methods that utilize a deep neural network to process object user indicators and an initial object segmentation from a digital image to efficiently and flexibly generate improved, more accurate object segmentations. For example, in some embodiments, the disclosed systems utilize an automatic selection model (e.g., a salient object neural network) to present an initial object segmentation for display within a user interface. Subsequently, the disclosed systems can identify user input of object user indicators (e.g., positive/negative clicks in the digital image indicating foreground or background pixels). In one or more embodiments, the disclosed systems process the object user indicators, the digital image, and the initial object segmentation utilizing a deep neural network to generate and provide an updated object segmentation for display within the user interface. In this manner, the disclosed systems can efficiently and flexibly generate enhanced, refined object segmentations to identify objects portrayed within digital images.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 2 illustrates an object segmentation system utilizing a segmentation neural network to generate an updated object segmentation in accordance with one or more embodiments.

DETAILED DESCRIPTION

Figure 1:
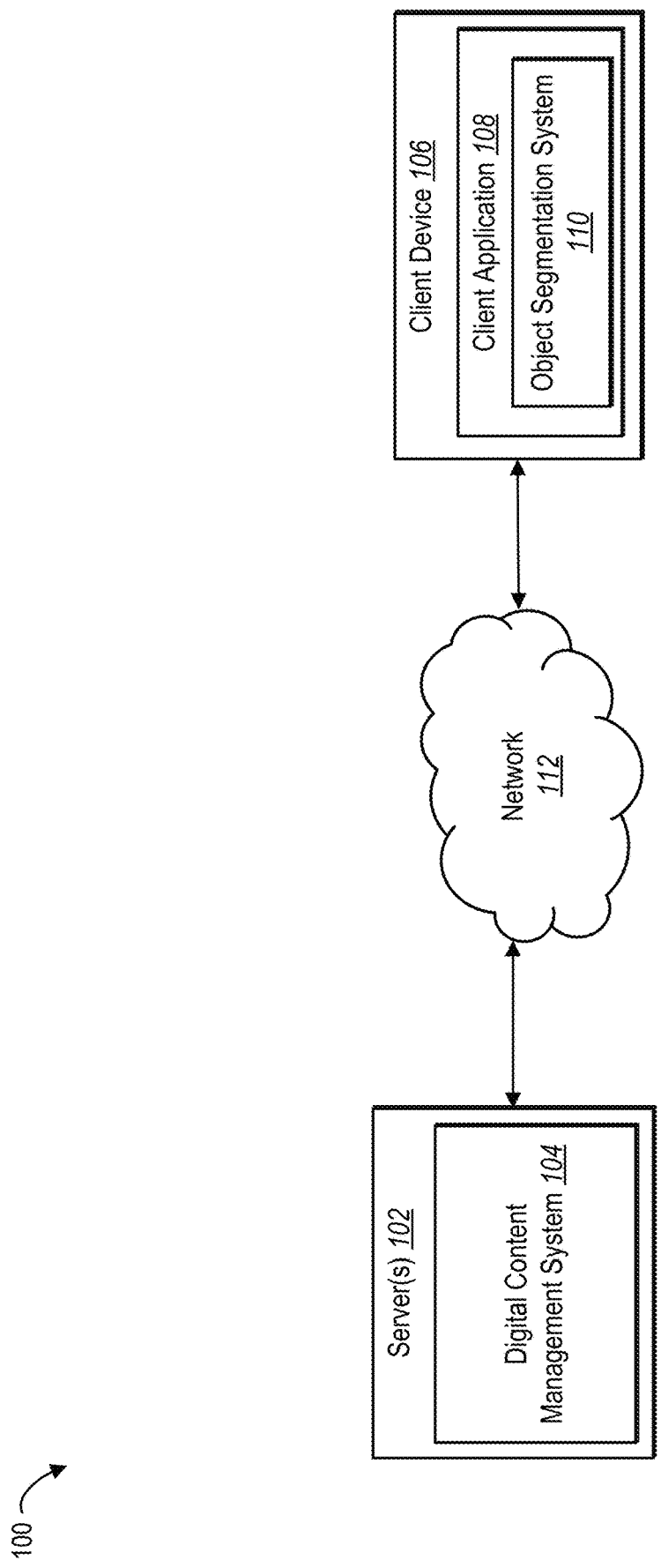
FIG. 1 illustrates a computing system environment for implementing an object segmentation system in accordance with one or more embodiments.

One or more embodiments described herein include an object segmentation system that intelligently corrects mistakes in an initial object segmentation of an object portrayed in a digital image by using a segmentation neural network to process object user indicators together with an initial object segmentation for the digital image. To illustrate, in some embodiments, the object segmentation system identifies an initial object segmentation by processing the digital image utilizing an initial object segmentation model. In one or more embodiments, the object segmentation system provides this initial object segmentation for display via a user interface and receives (via the user interface) object user indicators such as positive or negative clicks indicating foreground or background pixels. The object segmentation system processes these object user indicators together with the initial object segmentation to generate an improved object segmentation. For example, the object segmentation system generates a distance map from the object user indicators and then processes the distance map and the initial object segmentation through various input channels to predict an improved object segmentation. In this manner, the object segmentation system can efficiently and flexibly generate more precise, accurate object segmentation masks for object portrayed in digital images.

As mentioned above, one or more embodiments of the object segmentation system generate an initial object segmentation for a digital image. For example, in some cases, the object segmentation system automatically generates the initial object segmentation utilizing an object segmentation model (e.g., a salient object neural network, a foreground/background segmentation neural network, etc.). In these or other embodiments, the object segmentation system generates the initial object segmentation with little or no user input. In other embodiments, the object segmentation system generates the initial object segmentation based on an interactive selection process. For example, the object segmentation system generates the initial object segmentation in response to a variety of user input modalities (e.g., positive/negative inputs, boundary inputs, language inputs, etc.). To illustrate, in response to a click or stroke on a digital object, the object segmentation system generates the initial object segmentation comprising the digital object.

Additionally, in some embodiments, the object segmentation system provides the initial object segmentation for display within a user interface. Based on user interaction with the user interface, in one or more embodiments the object segmentation system identifies one or more object user indicators that include a user selection of a portion of the digital image and how the portion of the digital image relates to a desired object portrayed in the digital image. To illustrate, a positive/negative object user indicator (e.g., a click, tap, or stroke) indicates whether the portion of the digital image should be added to or excluded from the initial object segmentation. In additional examples, a boundary object user indicator (e.g., an edge click) indicates a segmentation boundary between objects, while a bounding shape object user indicator (e.g., a bounding box) indicates a segmentation around an object.

As mentioned, in some embodiments the object segmentation system generates a distance map based on an identified object user indicator. To illustrate, the object segmentation system determines distances between pixels of the digital image and the object user indicator and populates the distance map utilizing these distances. For example, consider an instance where the object segmentation system receives a first object user indicator (e.g., a positive click) and a second object user indicator (e.g., a negative click). In response, the object segmentation system can determine distances between each pixel in the object user indicators and then generate a first distance map reflecting distances to the first object user indicator and a second distance map reflecting distances to the second object user indicator. The object segmentation system can utilize a variety of approaches to transform object user indicators. Moreover, in some embodiments, the object segmentation system does not generate distance maps, but processes object user indicators directly (e.g., without transformation).

In some embodiments, the object segmentation system processes a combination of inputs utilizing a segmentation neural network to intelligently generate an updated, improved object segmentation for the digital image. For example, the object segmentation system processes a combination (e.g., concatenation) of the digital image, the distance map(s), and the initial object segmentation utilizing the segmentation neural network. Based on the combination of inputs, the object segmentation system can utilize the segmentation neural network to generate a variety of outputs in determining an object segmentation. For instance, in some embodiments, the segmentation neural network generate a binary segmentation mask. In one or more embodiments, the segmentation neural network generates a probability map.

To illustrate, in some embodiments the object segmentation utilizes the segmentation neural network to generate a probability map and then performs additional post-processing of the probability map to generate a final object segmentation mask. For example, the object segmentation system processes the probability map utilizing a graph cut algorithm. The graph cut algorithm can analyze the probability map and the input digital image to determine precise edges and further improve the accuracy and sensitivity of the resulting segmentation mask.

As mentioned above, upon identified an updated, refined object segmentation, in some embodiments the object segmentation system provides the object segmentation mask for display. Moreover, the object segmentation system can receive additional user object identifiers and generate a further refined object segmentation. In this manner, the object segmentation system can iteratively and efficiently analyze a few intuitive user interactions to generate a precise object segmentation from an input digital image.

In certain embodiments, the object segmentation system can further improve efficiency by utilizing a dual branch architecture of the segmentation neural network that includes multiple encoders. For example, in a first encoder branch, the object segmentation system processes the digital image and the initial object segmentation (e.g., to generate a first set of feature vectors) prior to identifying an object user indicator. Additionally, upon identifying an object user indicator, the object segmentation system can utilize a second encoder branch to process a distance map corresponding to the identified object user indicator (e.g., to generate a second set of feature vectors). In turn, the object segmentation system utilizes a decoder of the segmentation neural network to analyze first set of feature vectors and the second set of feature vectors and generate an updated object segmentation. This dual channel network architecture can allow an implementing device to more quickly generate and render an updated object segmentation in response to user input. Indeed, by preprocessing more computationally heavy elements (e.g., a digital image and/or initial object segmentation) in a first encoder branch and subsequently processing less computationally heavy elements (e.g., a distance map) in a second encoder branch, the segmentation neural network can further increase efficiency and user interface responsiveness.

As mentioned above, a number of problems and shortcomings exist with conventional object selection systems, particularly with regard to accuracy, efficiency, and flexibility of implementing devices. For example, some conventional object selection systems generate inaccurate and imprecise object segmentations. To illustrate, some conventional systems provide a tracing tool to trace around the boundaries of an object. Such tracing tools, however, are notoriously imprecise and generate object segmentations with a variety of artifacts.

Some conventional object selection systems use automatic object segmentation tools to identify significant objects portrayed in a digital image. However, these approaches are often inaccurate. As an initial matter, automatic segmentation algorithms often add background pixels or erroneously classify foreground pixels in determining an object segmentation. In addition, such algorithms often fail to determine unique objects in accordance with individual or particular device needs. For example, if a client device seeks to select a single dog in a digital image portraying a collection of dogs, systems that automatically segment digital objects often inaccurately segment all dogs portrayed in the digital image (or the wrong dog). Conventional systems are also inaccurate and imprecise in correcting these segmentation mistakes.

In addition to these inaccuracy concerns, conventional systems are also inefficient. Indeed, conventional object selection systems often require an exorbitant amount of time, user interactions, and processing power to identify object segmentations from a digital image. To illustrate, as mentioned above, some conventional object selection systems require client devices to utilize a tracing tool trace around the boundaries of an object. This approach takes significant time and resources, particularly in digital images portraying non-uniform objects (such as people, animals, foliage, etc.). These inefficiencies increase exponentially in considering the interactions and resources required to identify and correct mistakes in segmentations resulting from tracing tools). Similarly, as mentioned above, some conventional systems automatically predict an object segmentation. However, given the inaccuracies discussed above, these approaches also require significant resources in correcting these segmentations. For example, if a conventional system automatically selects a group of dogs (instead of a single dog) or erroneously misclassifies a batch of background pixels, conventional systems can require significant resources to correct such a mistake. Indeed, conventional systems will often require a selection or correction tool to identify each mistake in an object selection (e.g., by modifying or moving an object boundary). In many cases, these approaches of conventional object selection systems require excessive numbers of strokes, clicks, or boundary selections, a large number of user interface updates, and a corresponding waste of computing resources.

Further, conventional systems are often rigid and inflexible. Indeed, some conventional object selection systems require fixed inputs for identifying object segmentations and/or correcting segmentation errors. Indeed, depending on the particular implementation, many systems utilize a single editing tool for cropping or extracting object segmentations. These overly rigid approaches further exacerbate the inefficiencies and inaccuracies described above.

In contrast, the object segmentation system provides several improvements over conventional object selection systems. For example, the object segmentation system can improve the accuracy of object segmentations. Indeed, by utilizing a deep neural network to process an initial object segmentation and object user indicators, the object segmentation system can generate object segmentations with fewer incorrect/unwanted pixels. As described in greater detail below (with regard to FIG. 8) researches have shown that the object segmentation system can provide significant accuracy improvements relative to machine learning models that utilize alternative approaches.

In addition to accuracy improvements, the object segmentation system can also improve efficiency relative to conventional systems. For example, by processing an initial object segmentation in combination with other inputs utilizing a segmentation neural network, the object segmentation system can significantly reduce user interactions, time, and processing power. For instance, with the added context of the initial object segmentation, the object segmentation system can more meaningfully interpret user input to correct mistakes in an initial object segmentation within fewer iterations (e.g., processing cycles).

As mentioned above, the object segmentation system can further improve efficiency by utilizing a dual-branched network architecture. In particular, the object segmentation system can process a digital image and an initial object segmentation in a first encoder branch. Then, at a later time in a second encoder branch, the object segmentation system can process a distance map corresponding to an identified object user indicator. Utilizing this approach, the object segmentation system can significantly reduce processing time and peak bandwidth resources. Accordingly, the object segmentation system can be implemented on a variety of devices, including client devices, such as mobile devices, with limited processing bandwidth.

Further, the object segmentation system can provide improved system flexibility over conventional object selection systems. As just mentioned, the object segmentation system can be implemented across a variety of different computing devices. In addition, the object segmentation system can flexibly accommodate an initial object segmentation in addition to a variety of object user indicators. For example, as discussed in greater detail below, the object segmentation system can analyze positive/negative clicks, boundary selections, bounding boxes, or a variety of additional object user indicators while also processing an initial object segmentation to generate an improve segmentation output.

Additional detail will now be provided in relation to illustrative figures portraying example embodiments and implementations of the object segmentation system. For example, FIG. 1 illustrates a computing system environment (or "environment") 100 for implementing an object segmentation system 110 in accordance with one or more embodiments. As shown in FIG. 1, the environment 100 includes server(s) 102, a client device 106, and a network 112. In one or more embodiments, each of the components of the environment 100 communicate (or are at least configured to communicate) via the network 112. Example networks are discussed in more detail below in relation to FIG. 12.

As shown in FIG. 1, the environment 100 includes the client device 106. The client device 106 includes one of a variety of computing devices, including a smartphone, tablet, smart television, desktop computer, laptop computer, virtual reality device, augmented reality device, or other computing device as described in relation to FIG. 12. Although FIG. 1 illustrates a single client device 106, in some embodiments the environment 100 includes multiple client devices 106. In these or other embodiments, the client device 106 communicates with the server(s) 102 via the network 112. For example, the client device 106 receives user input and provides to the server(s) 102 information pertaining to the user input (e.g., that relates to interactively segmenting an object portrayed in a digital image).

As shown, the client device 106 includes a corresponding client application 108. In particular embodiments, the client application 108 comprises a web application, a native application installed on the client device 106 (e.g., a mobile application, a desktop application, etc.), or a cloud-based application where part of the functionality is performed by the server(s) 102. In some embodiments, the client application 108 presents or displays information to a user associated with the client device 106, including an updated object segmentation for a digital image. For example, the client application 108 identifies user interactions via a user interface of the client device 106 to provide object user indicators with respect to portions of a digital image (e.g., for correcting an initial object segmentation of the digital image). In these or other embodiments, the term digital image refers to any digital symbol, graphic, picture, icon, or illustration. For example, the term "digital image" includes digital files with the following file extensions: JPG, TIFF, BMP, PNG, RAW, or PDF.

In some embodiments, the client application 108 causes the client device 106 to generate, store, receive, transmit, and/or execute electronic data, such as executable instructions for generating an updated object segmentation. For example, the executable instructions include determining an initial object segmentation for a digital image, identifying an object user indicator with respect to a portion of the digital image, and/or generating a distance map comprising distances between pixels of the digital image and/or the object user indicator. In some embodiments, the client application 108 then causes the client device 106 to generate an updated object segmentation for the digital image by processing the digital image, the distance map, and the initial object segmentation utilizing a segmentation neural network. These and other aspects of the client application 108 implementing the object segmentation system 110 are described in more detail below in relation to the subsequent figures.

As further illustrated in FIG. 1, the environment 100 includes the server(s) 102. In some embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement a digital content management system 104 that manages digital files (e.g., digital images for object segmentation). For example, in one or more embodiments, the digital content management system 104 receives, transmits, organizes, stores, updates, and/or recommends digital images to/from the client device 106. For instance, in certain implementations, the digital content management system 104 comprises a data store of digital images from which the client device 106 selects a digital image to perform object segmentation via the client application 108.

Although FIG. 1 depicts the object segmentation system 110 located on the client device 106, in some embodiments, the object segmentation system 110 is implemented by one or more other components of the environment 100 (e.g., by being located entirely or in part at one or more of the other components). For example, in one or more embodiments, the server(s) 102 and/or a third-party device implement the object segmentation system 110.

In some embodiments, though not illustrated in FIG. 1, the environment 100 has a different arrangement of components and/or has a different number or set of components altogether. For example, in certain embodiments, the environment 100 includes a third-party server (e.g., for storing digital images or other data). As another example, the client device 106 communicates directly with the server(s) 102, bypassing the network 112.

As mentioned above, the object segmentation system can flexibly and efficiently generate an accurate object segmentation by processing an initial object segmentation. FIG. 2 illustrates the object segmentation system 110 utilizing a segmentation neural network 212 to generate an updated object segmentation 214 in accordance with one or more embodiments. In particular, FIG. 2 shows the object segmentation system 110 utilizing a segmentation neural network 212 to process a digital image 202, a negative distance map 206, a positive distance map 208, and an initial object segmentation 210 to generate the updated object segmentation 214.

In some embodiments, the object segmentation system 110 utilizes the digital image 202 as an input by analyzing color channels of the digital image 202. For example, the term color channel can include an image input that corresponds to a particular color. To illustrate, in a red-green-blue ("RGB") input, a first color channel may include a red-color channel, a second color channel may include a green-color channel, and a third color channel may include a blue-color channel.

In particular embodiments, the object segmentation system 110 identifies pixel color values for each pixel of the digital image 202 and maps these pixel values to a corresponding color channel (e.g., red channel, green channel, and blue channel). Subsequently, as shown in FIG. 2, the object segmentation system 110 combines (e.g., concatenates) the color channels with other inputs described below.

Additionally shown in FIG. 2, the object segmentation system 110 identifies the object user indicators 204. For example, the term object user indicator can include a user interaction indicating a location of a digital image corresponding to an object. In particular, an object user indicator can include a user selection of a position and how the position relates to an object. To illustrate, an object user indicator can include a selection of one or more pixels within a digital image together with an indication as to how the one or more pixels correspond to a target object (e.g., a desired object for selection) portrayed in the digital image.

An object user indicator can take a variety of forms or input modalities (e.g., categories or types of object user indicators). For example, an input modality for an object user indicator can include a regional input modality, a boundary input modality, or a language input modality. To illustrate, a regional input modality refers to a type of object user indicator that indicates a portion of a digital image corresponds to a region within or outside a target object. Thus, a regional input modality can include a positive user indicator (e.g., a foreground point within a target object selected as a point or attention mask), a negative user indicator (e.g., a background point outside a target object selected as a point or soft click/scribble), etc. Similarly, a boundary input modality can include a boundary user indicator that indicates a boundary or edge of a target object. Thus, a boundary input modality includes an edge point (e.g., a selection on or near an edge of a target object), a bounding shape (e.g., a selection encompassing or near to the boundary of a target object), or a loose boundary. Moreover, a language input modality refers to a type of object user indicator that indicates a portion of a digital image via term(s) spoken or written.

In particular embodiments, the object segmentation system 110 identifies the object user indicators 204 in response to user interactions with the digital image 202 and/or the initial object segmentation 210. For example, the object user indicators 204 includes positive user indicators and negative user indicators. To illustrate, the positive user indicators (e.g., the dots depicted in the positive distance map 208) indicate one or more portions of the digital image 202 that portray the desired object. Similarly, in some embodiments, the negative user indicators (e.g., the "X's" depicted in the negative distance map 206) indicate one or more portions of the digital image 202 that do not portray the desired object.

Based on the object user indicators 204, the object segmentation system 110 generates the negative distance map 206 and the positive distance map 208. For example, the term distance map can include a digital item that reflects a distance between a pixel and user input corresponding to a digital image. For instance, a distance map can include a database or digital file that includes distances between pixels in a digital image and pixels indicated by an object user indicator. In some cases, the object segmentation system indicates the pixels for an object user indicator by applying a Gaussian blur (e.g., such that pixels correspond to an object user indicator from an epicenter of one or more pixels on outward in a dissipating fashion).

In some embodiments, a distance map comprises a positive distance map that includes a digital item that reflects a distance between a pixel in a digital image and user input of a pixel that is part of a target object (e.g., a positive regional input modality). Similarly, a negative distance map includes a digital item that reflects a distance between a pixel and user input of a pixel that is not part of a target object (e.g., via a negative regional input modality). Moreover, a boundary distance map includes a digital item that reflects a distance between a pixel and user input of a pixel that corresponds to a boundary of a target object (e.g., via a boundary input modality).

For example, the object segmentation system 110 determines distances between each pixel of the digital image 202 and the object user indicators 204. For instance, to generate the negative distance map 206, the object segmentation system 110 determines distances between each pixel of the digital image 202 and one or more of the negative user indicators of the object user indicators 204. Likewise, to generate the positive distance map 208, the object segmentation system 110 determines distance between each pixel of the digital image 202 and one or more of the positive user indicators of the object user indicators 204. Moreover, as shown in FIG. 2, the object segmentation system 110 combines (e.g., concatenates) the negative distance map 206 and the positive distance map 208 with other inputs. These and other aspects of generating distance maps are described more below, particularly in relation to FIG. 4. As mentioned above, in some embodiments, the object segmentation system 110 does not generate distance maps (but analyzes object user indicators directly utilizing a segmentation neural network).

As further shown in FIG. 2, the object segmentation system 110 accounts for additional contextual input by utilizing the initial object segmentation 210. In particular, the term object segmentation can include an indication of a plurality of pixels portraying one or more objects. For example, an object segmentation can include a segmentation boundary (e.g., a boundary line or curve indicating an edge of one or more objects) or a binary segmentation mask (e.g., a selection that definitively includes a first set of pixels and definitively excludes a second set of pixels as corresponding to an object). In another example, an object segmentation can include a probability map (e.g., a representation of a digital image that indicates, for each pixel, a likelihood of being included with or excluded from an object segmentation). In yet another example, an object segmentation can include a boundary edge description. Generating an object segmentation is sometimes referred to as "selecting" or "segmentation" a target object (e.g., identifying pixels that represent an object of interest).

Relatedly, the term initial object segmentation refers to/includes an object segmentation generated before an additional or subsequent object segmentation. For example, an initial object segmentation may include an object segmentation with one or more errors or mistakes for correcting based on an object user indicator.

To illustrate, in some embodiments, the object segmentation system 110 generates the initial object segmentation 210 utilizing an interactive user segmentation process (e.g., as described below in relation to FIG. 3A). In other embodiments, the object segmentation system 110 generates the initial object segmentation 210 utilizing an object segmentation model (e.g., as also described below in relation to FIG. 3A). In FIG. 2, the initial object segmentation 210 includes an object selection of an equestrian rider while on horseback. As depicted, the initial object segmentation 210 correctly excludes the horse but incorrectly excludes the rider's foot.

In some embodiments, the object segmentation system 110 generates an image-interaction-segmentation triplet by combining (e.g., concatenating) the digital image 202, the negative and positive distance maps 206, 208, and the initial object segmentation 210. The term image-interaction-segmentation triplet can include a combination of data inputs for generating an updated object segmentation. In particular, an image-interaction-segmentation triplet can include a combination of color channels for a digital image, a distance map, and an initial object segmentation. For example, an image-interaction-segmentation triplet can include a concatenation of color channels, distance map(s) corresponding to user interaction(s), and an initial object segmentation.

By processing the image-interaction-segmentation triplet, the segmentation neural network 212 generates the updated object segmentation 214 that includes the previously excluded rider's foot. The term updated object segmentation can include an object segmentation that is generated after an initial object segmentation. For example, an updated object segmentation may include a correction or update to the one or more errors found in an initial object segmentation.

To illustrate, by processing the image-interaction-segmentation triplet, the segmentation neural network 212 correctly maintains exclusion of the horse in the updated object segmentation 214 and introduces no new object selection errors. Thus, by accounting for the additional context of the initial object segmentation 210 in the image-interaction-segmentation triplet, the object segmentation system 110 can more efficiently and more accurately interpret the other inputs, such as the digital image 202, the negative distance map 206, and the positive distance map 208.

Although FIG. 2 shows the segmentation neural network 212 utilizing an initial object segmentation 210 depicted as a binary segmentation mask, in some embodiments, the initial object segmentation 210 is a probability map or a boundary edge description (e.g., as mentioned above). In addition (albeit not shown), one or more embodiments of the object segmentation system 110 operate without an initial object segmentation mask (e.g., in an initial pass prior to creation of an initial object segmentation). Then, after creating the initial object segmentation, one or more embodiments of the object segmentation system 110 identify object user indicators with respect to the initial object segmentation as described above.

Further, in some embodiments, the object segmentation system 110 omits one or both of the negative and positive distance maps 206, 208. For instance, although not shown in FIG. 2, the object segmentation system 110 can use the object user indicators 204 directly without transforming the object user indicators 204 into distance maps. In such an embodiment, the object segmentation system 110 utilizes the segmentation neural network 212 to generate the updated object segmentation 214 based on a combination of the digital image 202, the object user indicators 204, and the initial object segmentation 210.

As mentioned above, the object segmentation system 110 can generate an initial object segmentation and process the initial object segmentation in combination with other inputs for generating an updated object segmentation. FIGS. 3A-3B illustrate the object segmentation system 110 performing a series of acts in generating an initial object segmentation and processing the initial object segmentation to generate an updated object segmentation in accordance with one or more embodiments. As shown at an act 302 in FIG. 3A, the object segmentation system 110 generates an initial object segmentation (e.g., the same as or similar to the initial object segmentation 210 described above in relation to FIG. 2). In particular, the object segmentation system 110 utilizes one or both of an object segmentation model 304 or interactive user segmentation 306 to generate the initial object segmentation of a digital image (e.g., the digital image 318 shown in FIG. 3B). For example, the initial object segmentation includes one of a binary segmentation, a probability map, or another boundary edge description (although shown as a simple dashed selection).

In some embodiments, the object segmentation model 304 comprises a neural network. The term neural network refers to/includes a machine learning model that can be tuned (e.g., trained) based on inputs to approximate unknown functions. In particular, the term neural network can include a model of interconnected neurons arranged in layers that communicate and learn to approximate complex functions and generate outputs based on a plurality of inputs provided to the model. For instance, the term neural network includes one or more machine learning algorithms. In particular, the term neural network includes deep convolutional neural networks (i.e., "CNNs"), fully convolutional neural networks (i.e., "FCNs"), or recurrent neural networks ("RNNs") such as long short-term memory neural networks ("LSTMs"). In other words, a neural network is an algorithm that implements deep learning techniques, i.e., machine learning that utilizes a set of algorithms to attempt to model high-level abstractions in data.

Moreover, the term segmentation neural network refers to a neural network for generating updated object segmentations based on a combination of inputs that include at least an initial object segmentation. In training a segmentation neural network, the segmentation neural network can generate a predicted object segmentation (e.g., an estimated object segmentation for comparison with a ground truth object segmentation).

In these or other embodiments, the term object segmentation model refers to a computational model for segmenting an object portrayed in a digital image. An example of an object segmentation model includes a salient object segmentation neural network (e.g., as described by Pao et al. in U.S. patent application Ser. No. 15/967,928 filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, hereafter "Pao," the contents of which are expressly incorporated herein by reference). Another example of an object segmentation model may include foreground/background segmentation algorithms.

Figure 3A:
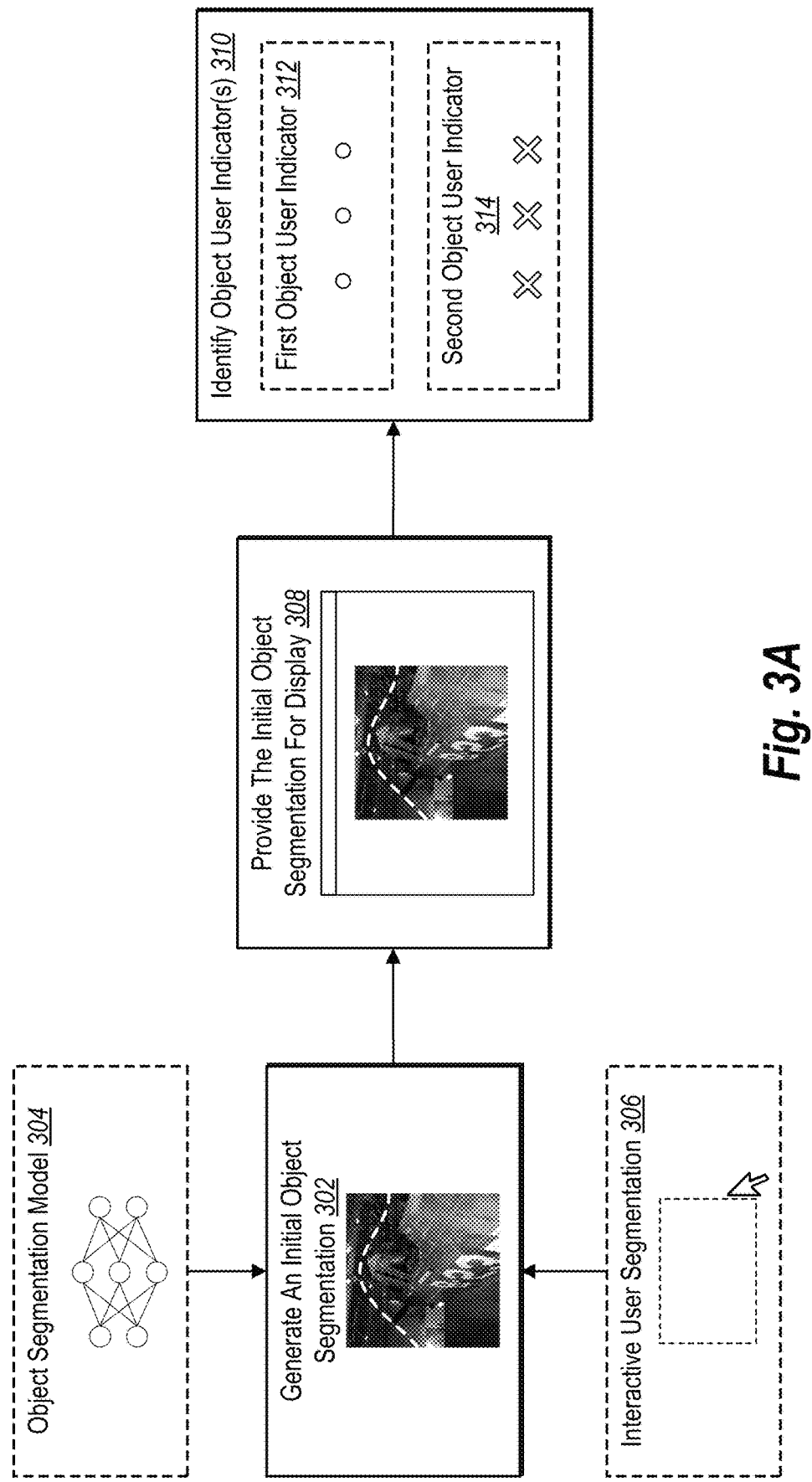
FIGS. 3A-3B respectively illustrate an object segmentation system generating an initial object segmentation and processing the initial object segmentation to generate an updated object segmentation in accordance with one or more embodiments.
Figure 3B:
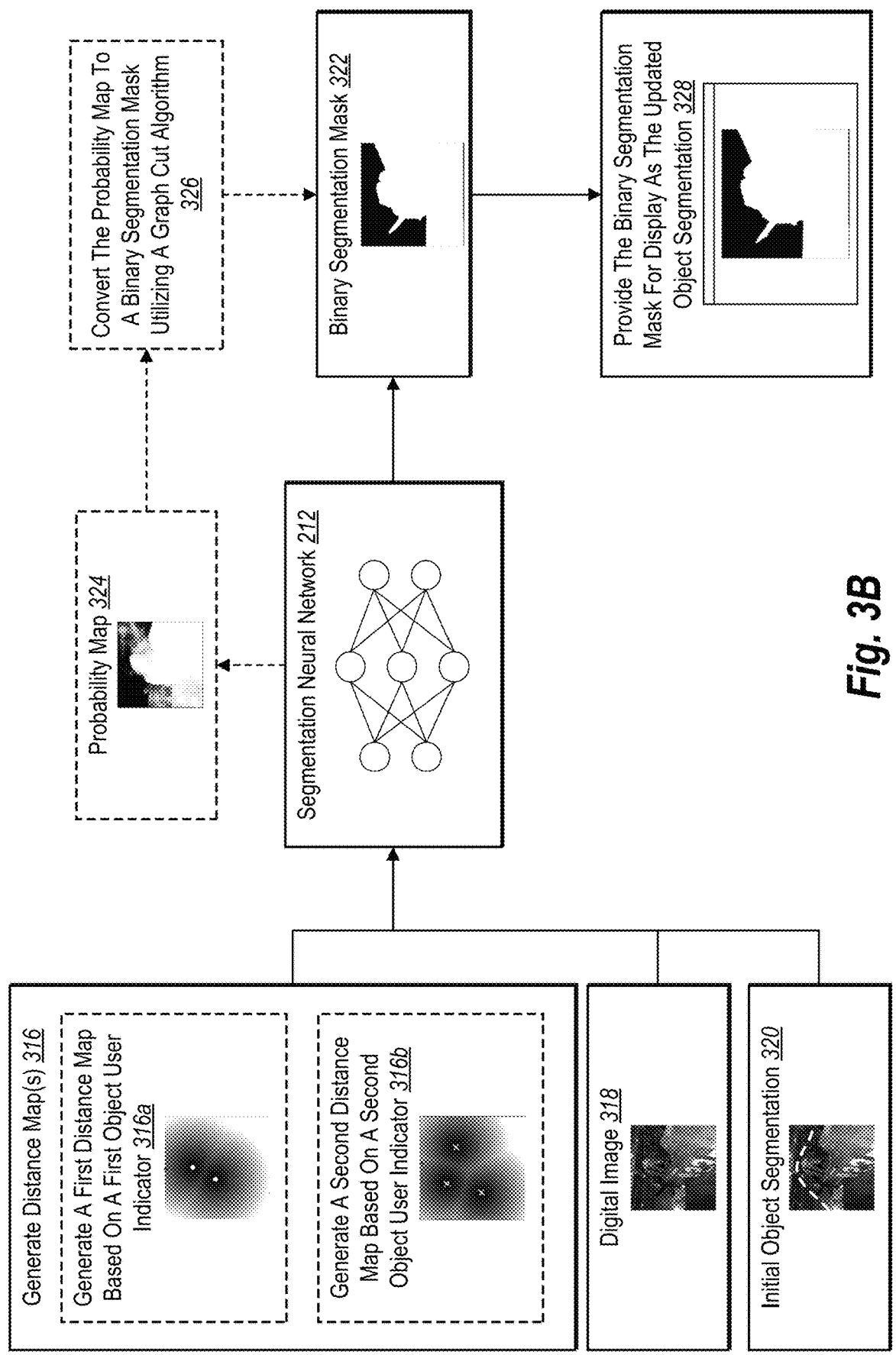

In one or more embodiments, FIG. 3A shows the object segmentation system 110 generates the initial object segmentation utilizing one or more automatic or semi-automatic selection methods. For example, in some embodiments, the object segmentation model 304 includes a salient object segmentation neural network that automatically selects a salient object portrayed in the digital image (e.g., by utilizing a convolutional neural network as described in Pao). In additional or alternative embodiments, the object segmentation model 304 includes a foreground/background segmentation algorithm. Additionally or alternatively, the object segmentation system 110 utilizes a salient content neural network to segment foreground and background pixels in a digital image (e.g., as described in U.S. patent application Ser. No. 15/799,395, filed on Oct. 31, 2017, entitled DEEP SALIENT CONTENT NEURAL NETWORKS FOR EFFICIENT DIGITAL OBJECT SEGMENTATION, the contents of which are expressly incorporated herein by reference).

In additional or alternative embodiments, the object segmentation system 110 generates the initial object segmentation utilizing the interactive user segmentation 306. For example, in response to identifying object user indicators from user input with respect to specific portions of the digital image, the object segmentation system 110 generates the initial object segmentation. To illustrate, the object segmentation system 110 identifies one or more of positive user indicators, negative user indicators, edge clicks, bounding shapes, etc. based on a selection of a software tool and a corresponding set of clicks/haptic inputs with the selected software tool.

In some embodiments, the object segmentation system 110 identifies one or more object user indicators of a single input modality. For example, the object segmentation system 110 may identify a user input to select a lasso selection tool and trace a single loose boundary around an object portrayed in the digital image. In other embodiments, the object segmentation system 110 identifies one or more object user indicators of multiple input modalities (e.g., some positive user indicators and some negative user indicators). In these or other embodiments, however, the object segmentation system 110 analyzes the object user indicator(s) as part of the interactive user segmentation 306 to correspondingly generate the initial object segmentation.

At an act 308, the object segmentation system 110 provides the initial object segmentation for display in a user interface of a client device. In some embodiments, the act 308 is an incremental process in which the object segmentation system 110 progressively generates the initial object segmentation (e.g., in response to each user input to provide an object user indicator as part of the interactive user segmentation 306). In other embodiments, the act 308 occurs a single time (e.g., the object segmentation system 110 receives and provide the output from the object segmentation model 304).

In some embodiments, the object segmentation system 110 performs the act 308 by graphically illustrating which portions of the digital image correspond to the initial object segmentation and/or which portions of the digital image do not correspond to the initial object segmentation. In certain embodiments, the object segmentation system 110 utilizes an outline or border around the portions of the digital image corresponding to the initial object segmentation. In additional or alternative embodiments, the object segmentation system 110 utilizes a color overlay or binary segmentation mask to show which portions of the digital image correspond to the initial object segmentation. Still, in other embodiments, the object segmentation system 110 utilizes a probability map (e.g., in grayscale) to indicate a spectrum of probabilities that the pixels in the digital image correspond (or do not correspond) to the initial object segmentation.

As shown in FIG. 3A, at an act 310 the object segmentation system 110 identifies object user indicators with respect to the digital image. For example, the object segmentation system 110 identifies a first object user indicator 312 and a second object user indicator 314. To illustrate, the object segmentation system 110 identifies the first object user indicator 312 based on a user selection of a first software tool via at least one of a voice command, hotkey, shortcut button, menu selection, or type of haptic input (e.g., press-and-hold, swipe, direction of swipe, number of fingers used, number of taps, combinations thereof, etc.). In certain embodiments, the object segmentation system 110 then identifies the first object user indicator 312 based on one or more user interactions with respect to the digital image using the first software tool. For example, the object segmentation system 110 identifies the first object user indicator 312 as corresponding to one or more positive user indicators. In other embodiments, however, the object segmentation system 110 identifies the first object user indicator 312 as corresponding to a variety object user indicators as described herein.

In a similar manner, the object segmentation system 110 identifies the second object user indicator 314. For example, the object segmentation system 110 identifies the second object user indicator 314 based on a user selection of a second software tool that differs from the first software tool via at least one of a voice command, hotkey, shortcut button, menu selection, or type of haptic input. In certain embodiments, the object segmentation system 110 then identifies the second object user indicator 314 based on one or more user interactions with respect to the digital image using the second software tool. For example, the object segmentation system 110 identifies the second object user indicator 314 as corresponding to one or more negative user indicators. In other embodiments, however, the object segmentation system 110 identifies the second object user indicator 314 as corresponding to a variety of object user indicators as described herein.

In some embodiments, the act 310 comprises the object segmentation system 110 identifying respective locations for the first object user indicator 312 and the second object user indicator 314. To identify the respective locations for the first object user indicator 312 and the second object user indicator 314, one or more embodiments of the object segmentation system 110 determines the pixels that correspond to the first object user indicator 312 and the second object user indicator 314. For instance, the object segmentation system 110 determines that the first object user indicator 312 corresponds to a first pixel and the second object user indicator 314 corresponds to a second pixel. In certain embodiments, the object segmentation system 110 then references an image coordinate system to identify pixel positions for the first object user indicator 312 and the second object user indicator 314.

As shown in FIG. 3B, the object segmentation system also performs an act 316 of generating distance maps based on the object user indicators. For example, at an act 316*a*, the object segmentation system 110 generates a first distance map based on a first object user indicator (e.g., the first object user indicator 312). To illustrate, the object segmentation system 110 generates the first distance map by determining, for each pixel in the digital image (i.e., the digital image 318), a respective distance value comprising a distance to a location corresponding to the first object user indicator.

Similarly, at an act 316*b*, the object segmentation system 110 generates a second distance map based on a second object user indicator (e.g., the second object user indicator 314). To illustrate, the object segmentation system 110 generates the second distance map by determining, for each pixel in the digital image 318, a respective distance value comprising a distance to a location corresponding to the second object user indicator. Additional detail regarding the generation of distance maps is provided below in relation to FIG. 4. Moreover, although FIG. 3B depicts generation of only a first and second distance map, one or more embodiments of the object segmentation system 110 generate additional distance maps (e.g., one for each input modality of object user indicator).

As illustrated in FIG. 3B, the object segmentation system 110 utilizes the segmentation neural network 212 to process the distance maps, the digital image 318, and an initial object segmentation 320 generated for the digital image 318. For example, in some embodiments, the segmentation neural network 212 comprises a convolutional neural network comprising a variety of convolutional layers to process these inputs. Although the segmentation neural network 212 can utilize a variety of architectures, in one or more embodiments the object segmentation system 110 utilizes the neural network architecture DeepLabv3 as described in Liang-Chieh Chen, George Papandreou, Florian Schroff, and Hartwig Adam, *Rethinking Atrous Convolution for Semantic Image Segmentation*, archived at arxiv.org/pdf/1706.05587.pdf, the contents of which are expressly incorporated herein by reference). In these or other embodiments, the segmentation neural network 212 processes inputs utilizing one or more neural network layers that execute atrous spatial pyramid pooling, batch normalization, and other operations that analyze image-level features.

Additionally or alternatively, the segmentation neural network 212 processes the distance maps, the digital image 318, and the initial object segmentation 320 utilizing other computational models or neural networks (e.g., DeepCut as described in Martin Rajchl, Matthew C. H. Lee, Ozan Oktay, Konstantinos Kamnitsas, Jonathan Passerat-Palmbach, Wenjia Bai, Mellisa Damodaram, Mary A Rutherford, Joseph V Hajnal, Bernhard Kainz, and Daniel Rueckert, *DeepCut: Object Segmentation from Bounding Box Annotations using Convolutional Neural Networks*, archived at arxiv.org/pdf/1605.07866.pdf, hereafter "Rajchl," the contents of which are expressly incorporated herein by reference).

Based on the segmentation neural network 212 processing the distance maps, the digital image 318, and the initial object segmentation 320, FIG. 3B shows the object segmentation system 110 generating a binary segmentation mask 322. In some embodiments, the binary segmentation mask 322 comprises a first set of pixels for the digital image 318 that correspond to an object (e.g., a target object) portrayed in the digital image 318. In certain embodiments, the binary segmentation mask 322 further comprises a second set of pixels for the digital image 318 that do not correspond to the target object. Given the binary nature of this implementation, the first set of pixels and the second set of pixels are mutually exclusive. Thus, in some embodiments, the first set of pixels in the binary segmentation mask 322 (which correspond to the target object) are white, and the second set of pixels in the binary segmentation mask 322 (which do not correspond to the target object) are black. In other embodiments, the binary segmentation mask 322 comprises other suitable mask colors.

As shown in FIG. 3B, in one or more embodiments the segmentation neural network 212 generates a probability map 324. In some embodiments, the probability map 324 comprises a grayscale version of the digital image 318 in which the pixels either comprise a black color, a white color, or one of various shades of gray between black and white. For instance, based on determining a probability value for each pixel, the segmentation neural network 212 reproduces the pixels with a corresponding level of grayscale to visually indicate the probabilities that the pixels correspond (or do not correspond) to the target object.

In other embodiments, the segmentation neural network 212 generates the probability map 324 in other suitable forms. For example, in some embodiments, the segmentation neural network 212 generates the probability map 324 as comprising other visual indicators that represent a statistical probability on a per-pixel basis (e.g., colored heat indications, added dimensions (e.g., topography), etc.). As another example, the segmentation neural network 212 generates the probability map 324 in non-visual forms. For example, in some embodiments, the segmentation neural network 212 generates the probability map 324 in a table format, a matrix format, a vector format, etc.

The segmentation neural network 212 can utilize the probability map in concert with the digital image in determining an object segmentation. For example, at an act 326 the object segmentation system 110 converts the probability map 324 to a binary segmentation mask (e.g., the binary segmentation mask 322) utilizing a graph cut algorithm. The term graph cut algorithm refers to/includes an optimization model for refining an object boundary corresponding to a target object. In particular, a graph cut algorithm can apply one or more optimization algorithms to certain pixels that correspond to a probability map (e.g., pixels that meet or exceed a threshold probability value of corresponding to a target object). For example, a graph cut algorithm can include the algorithm described by Price et al. in U.S. patent application Ser. No. 16/376,704 filed on Apr. 5, 2019, entitled UTILIZING INTERACTIVE DEEP LEARNING TO SELECT OBJECTS IN DIGITAL VISUAL MEDIA, hereafter "Price," the contents of which are expressly incorporated herein by reference.

In some embodiments, the object segmentation system 110 utilizes the graph cut algorithm to compare, for each pixel, a threshold cost value and a respective cost value to label a pixel as corresponding to a foreground portion or a background portion of the digital image. The object segmentation system 110 can utilize the probability map 324 in concert with edges and color variations from the digital image to determine boundaries for an object segmentation.

Take, for example, a pixel from the probability map 324 indicating a higher likelihood (e.g., 98%) that the pixel is part of a target object in the foreground. In this example, the object segmentation system 110 utilizes the graph cut algorithm to assign that pixel a higher cost value to label that pixel as corresponding to the background outside of the target object. Further, by applying the graph cut algorithm, the higher cost value for that pixel exceeds (e.g., fails to satisfy) the threshold cost to label that pixel as a background pixel. Therefore, the object segmentation system 110 utilizes the graph cut algorithm to assign that pixel as corresponding to the target object.

Similarly, take for instance a pixel from the probability map 324 indicating a lower likelihood (e.g., 15%) that the pixel is part of the target object in the foreground. In this example, the object segmentation system 110 utilizes the graph cut algorithm to assign that pixel a lower cost value to label that pixel as corresponding to the background outside of the target object. Further, by applying the graph cut algorithm, the lower cost value for that pixel falls below (e.g., satisfies) the threshold cost to definitively label that pixel as a background pixel. Therefore, the object segmentation system 110 utilizes the graph cut algorithm to assign that pixel as corresponding to a portion of the digital image 318 outside of the target object (e.g., as background). In this manner, one or more embodiments of the object segmentation system 110 utilize the graph cut algorithm to convert the probability map 324 to the binary segmentation mask 322 previously described above. Additional or alternative aspects of the graph cut algorithm are described in Price, which is incorporated by reference above.

As shown in FIG. 3, the object segmentation system 110 also performs an act 328, by providing the binary segmentation mask 322 for display as the updated object segmentation. For example, the object segmentation system 110 causes a client device to render the binary segmentation mask 322 in place of the initial object segmentation 320 previously provided for display at the act 308.

Once provided for display, a user associated with the client device can utilize the updated object segmentation in a variety of ways. For example, in some embodiments, the object segmentation system 110 cuts and pastes the updated object segmentation to a different location or layer within the digital image. Alternatively, the object segmentation system 110 cuts and pastes the updated object segmentation to a different digital image, a different digital document, or an electronic communication (e.g., a social media post, a text message, etc.).

Further, in some embodiments, the object segmentation system 110 modifies the updated object segmentation (e.g., by adjusting a color, saturation, lighting, etc.). Alternatively, in some embodiments, the object segmentation system 110 provides one or more artistic effects to the updated object segmentation (e.g., filters, borders, textures, paint strokes, etc.).

Similarly, in some embodiments, the object segmentation system 110 removes the updated object segmentation. To illustrate, the object segmentation system 110 displays, within a user interface, whitespace in place of the removed updated object segmentation. In other embodiments, the object segmentation system 110 displays, within the user interface, a background layer, pattern, or other object in place of the removed updated object segmentation.

If additional updating or correction to the updated object segmentation is needed, one or more embodiments of the object segmentation system 110 repeat the foregoing acts and algorithms. In this iterative example, one or more embodiments of the object segmentation system 110 generate additional distance maps based on additional object user indicators. Then, one or more embodiments of the object segmentation system 110 generate another updated object segmentation by utilizing the segmentation neural network 212 to process the additional distance maps along with the initial object segmentation 320 and the digital image 318. In this manner, one or more embodiments of the object segmentation system 110 utilize the same initial object segmentation 320 and the digital image 318 for each iteration that accounts for new distance maps.

In other embodiments, the object segmentation system 110 iterates utilizing a different approach. For example, in some embodiments, the updated object segmentation becomes a new initial object segmentation. In these or other embodiments, the object segmentation system 110 then identifies additional object user indicators with respect to the new initial object segmentation, and so forth as described above. Thus, in some embodiments, the object segmentation system 110 utilizes additional distance maps and an updated object segmentation as the next initial object segmentation to iteratively generate a new updated object segmentation.

Modifications, additions, or omissions may be made to the embodiments illustrated and described in relation to FIGS. 3A-3D without departing from the scope of the present disclosure. For example, in some embodiments the object segmentation system 110 additionally analyzes previous clicks and/or progressions of an initial object segmentation. For instance, in certain embodiments, the object segmentation system 110 generates a first stage of an initial object segmentation in response to a positive user indicator. Then, in view of the initial object segmentation (and/or corresponding positive user indicator), the object segmentation system 110 generates a second stage of the initial object segmentation in response to a negative user indicator. In this manner, one or more embodiments of the object segmentation system 110 utilize an output of a first iteration as an input to a second iteration (e.g., to improve accuracy of an initial object segmentation).

Although not illustrated, in some embodiments, the object segmentation system 110 generates the probability map 324 and subsequently performs post-processing utilizing an object refinement neural network instead of a graph-cut algorithm. For example, the object segmentation system 110 trains the object refinement neural network to identify needed adjustments to certain probability values in a probability map (e.g., less probable values to provide more accurate probability maps for soft-mask applications). In these or other embodiments, the object segmentation system 110 trains such an object refinement neural network by comparing predicted probability-value adjustments with ground truth object segmentations. Based on the comparison, one or more embodiments of the object segmentation system 110 utilize a loss function to determine a loss value for updating one or more parameters of the object refinement neural network.

Further, although not illustrated, in some embodiments the object segmentation system 110 utilizes the probability map 324 as an object segmentation mask. In particular, the object segmentation system 110 does not generate the binary segmentation mask 322 but utilizes the probability map 324 as the object segmentation mask. For example, in some embodiments, the client application of the client device displays a representation of the probability map 324 or otherwise utilizes the probability map 324 as an object segmentation.

Figure 4:
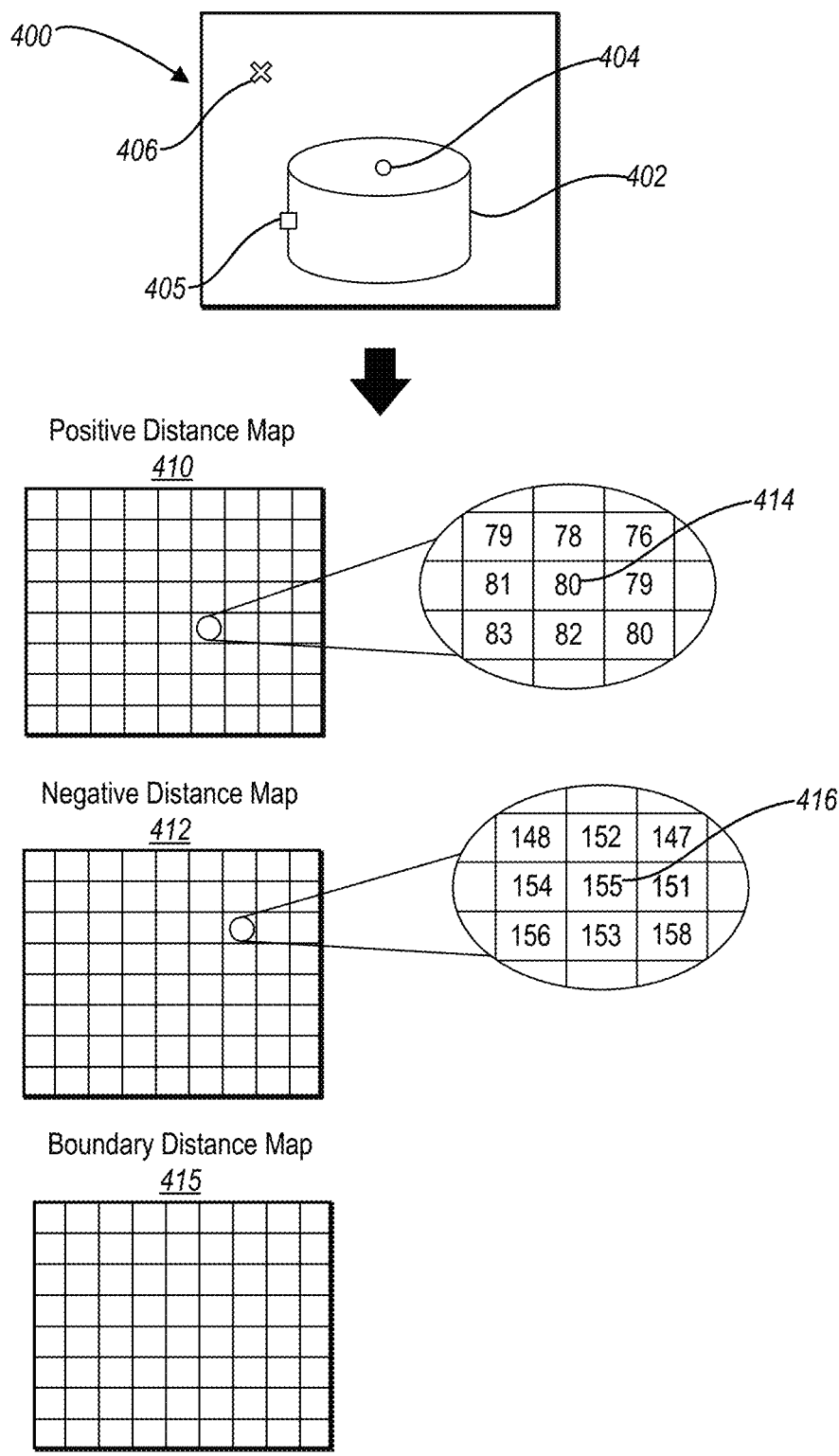
FIG. 4 illustrates an object segmentation system generating distance maps based on object user indicators in accordance with one or more embodiments.

As mentioned above, the object segmentation system 110 generates distance maps based on distances between pixels of a digital image and an object user indicator. FIG. 4 illustrates the object segmentation system 110 generating distance maps based on object user indicators in accordance with one or more embodiments. In particular, FIG. 4 illustrates an instance of a digital image (i.e., a digital image 400) portraying a target object 402. FIG. 4 also illustrates a positive user indicator 404, a boundary user indicator 405, and a negative user indicator 406 that each corresponds to a discrete user input with respect to the digital image 400.

Using the positive user indicator 404, the object segmentation system 110 generates a positive distance map 410. In particular, the positive distance map 410 comprises a two-dimensional matrix with entries for each pixel in the digital image 400. Specifically, the positive distance map 410 comprises a matrix with entries for pixels in the digital image 400, where each entry reflects the distance between the pixel corresponding to the entry and the positive user indicator 404. Thus, as illustrated, an entry 414 in the positive distance map 410 reflects the distance (e.g., 80 pixels) between the pixel corresponding to the entry 414 and the pixel corresponding to the positive user indicator 404.

Similarly, using the negative user indicator 406, the object segmentation system 110 generates a negative distance map 412. In particular, the negative distance map 412 comprises a two-dimensional matrix with entries for each pixel in the digital image 400. Specifically, the negative distance map 412 comprises a matrix with entries for pixels in the digital image 400, where each entry reflects the distance between the pixel corresponding to the entry and the negative user indicator 406. Thus, as illustrated, an entry 416 in the negative distance map 412 reflects the distance (e.g., 155 pixels) between the pixel corresponding to the entry 416 and the pixel corresponding to the negative user indicator 406.

Likewise, the object segmentation system 110 generates a boundary distance map 415 using the boundary user indicator 405. Like the two-dimensional matrices for the positive distance map 410 and the negative distance map 412, each entry in the boundary distance map 415 reflects the distance between the pixel corresponding to the entry and the boundary user indicator 405.

With regards to generating distance maps (e.g., the positive distance map 410, the negative distance map 412, and the boundary distance map 415), one or more embodiments of the object segmentation system 110 utilize any of a variety of distance metrics. For example, in some embodiments, the object segmentation system 110 calculates Euclidean distances. To illustrate, the object segmentation system 110 utilizes a Euclidean distance to determine a straight-line distance between two pixels.

In other embodiments, the object segmentation system 110 utilizes different distance metrics to generate distance maps. For example, one or more embodiments of the object segmentation system 110 utilize a geodesic distance that follows curved paths. In one or more embodiments the object segmentation system 110 implements a Gaussian blur. In particular, the object segmentation system 110 can apply a Gaussian blur to an image of object user indicator(s) to dissipate or blur the object user indicator(s). The pixels of the resulting blurred image also reflect proximity/distances between the pixels and the object user indicator. As another example, one or more embodiments of the object segmentation system 110 utilize Gaussian functions that do not linearly change with distance, such as $\exp(-k \text{ (Euclidean distance)}^2)$. These and other aspects of generating distance maps are described in further detail in Price, which is incorporated by reference above.

For example, in some embodiments, the object segmentation system 110 identifies multiple object user indicators of a same input modality (e.g., multiple positive user indicators). In these or other embodiments, the object segmentation system 110 generates a distance map by identifying, for each pixel, a distance to the nearest object user indicator. In other embodiments, the object segmentation system 110 generates a distance map using different approaches. For instance, in some embodiments, the object segmentation system 110 generates a distance map by identifying, for each pixel, a weighted distance value between two or more object user indicators.

Figure 5:
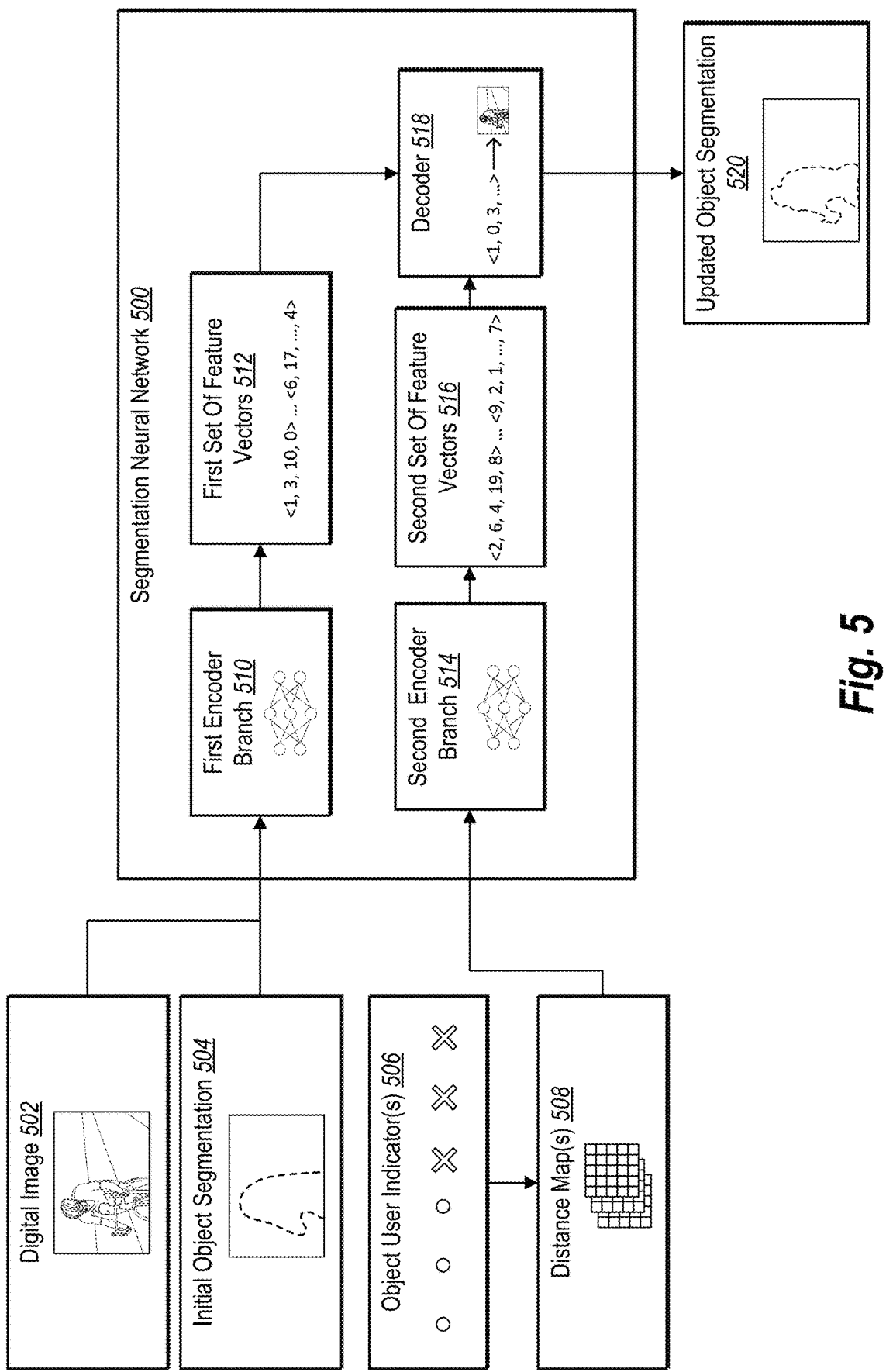
FIG. 5 illustrates an object segmentation system utilizing a segmentation neural network to generate an updated object segmentation in accordance with one or more embodiments.

As mentioned above, one or more embodiments of the object segmentation system 110 utilize a dual branch neural network architecture for implementation on client device (e.g., to enable faster runtime in response to user input). FIG. 5 illustrates the object segmentation system 110 utilizing a segmentation neural network 500 to generate an updated object segmentation 520 in accordance with one or more embodiments. As shown in FIG. 5, the segmentation neural network 500 comprises dual encoder branches that separately process different inputs. In particular, the segmentation neural network 500 includes a first encoder branch 510 that processes a digital image 502 and an initial object segmentation 504. In addition, the segmentation neural network 500 includes a second encoder branch 514 that processes distance map(s) 508.

As illustrated in FIG. 5, the first encoder branch 510 generates a first set of feature vectors 512 by processing the digital image 502 and the initial object segmentation 504. The term feature vector refers to/includes a data representation or encoding. In particular, a set of feature vectors may include a string or matrix of data values generated by an encoder from color channels in a digital image or an initial object segmentation. Similarly, a set of feature vectors may include a string or matrix of data values generated by an encoder from object user indicators.

To illustrate, the first encoder branch 510 processes the digital image 502 to generate a portion of the first set of feature vectors 512 comprising a vector representation of the color channels. Similarly, in some embodiments, the first encoder branch 510 processes the initial object segmentation 504 to generate a portion of the first set of feature vectors 512 comprising a vector representation of the initial object segmentation 504.

With respect to the second encoder branch 514, the second encoder branch 514 generates a second set of feature vectors 516 by processing the distance map(s) 508. To illustrate, the second encoder branch 514 processes the distance map(s) 508 to generate one or more vector representations of the distance map(s) 508 (e.g., one or more vectors of distance entries corresponding to respective distances from the pixels of the digital image 502 to the object user indicator(s) 506). In certain embodiments, the second encoder branch 514 generates at least one feature vector of the second set of feature vectors 516 for each distance map of the distance map(s) 508. Thus, in some embodiments, one feature vector of the second set of feature vectors 516 corresponds to a first distance map of the distance map(s) 508 that is based on a first object user indicator of the object user indicator(s) 506. Likewise, in some embodiments, another feature vector of the second set of feature vectors 516 corresponds to a second distance map of the distance map(s) 508 that is based on a second object user indicator of the object user indicator(s) 506.

By processing the distance map(s) 508 separate from the digital image 502 and the initial object segmentation 504, one or more embodiments of the object segmentation system 110 improve overall runtime speed. For example, the object segmentation system 110 utilizes the first encoder branch 510 to get a head start in performing the more computationally heavy operations to generate the first set of feature vectors 512 prior to identifying the object user indicator(s) 506. In some cases, the first encoder branch 510 finishes generating the first set of feature vectors 512 before the object segmentation system 110 identifies the object user indicator(s) 506. Then, upon identifying the object user indicator(s) 506, one or more embodiments of the object segmentation system 110 utilize the second encoder branch 514 to more quickly generate the second set of feature vectors 516 based on the distance map(s) 508.

Additionally shown in FIG. 5, the segmentation neural network 500 comprises a decoder 518. Utilizing the decoder 518, the object segmentation system 110 decodes the first set of feature vectors 512 and the second set of feature vectors 516 to generate the updated object segmentation 520. For example, the decoder 518 combines the first set of feature vectors 512 and the second set of feature vectors 516 to generate an image-interaction-segmentation triplet as briefly mentioned above. Then, one or more embodiments of the decoder 518 utilize a decoding layer of the neural network to transform the image-interaction-segmentation triplet to an image comprising the updated object segmentation 520.

As previously mentioned, one or more embodiments of the segmentation neural network 500 are configured for implementation on client devices. To do so, one or more embodiments of the segmentation neural network 500 comprise additional or alternative elements than illustrated in FIG. 5. For example, in some embodiments, the segmentation neural network 500 additionally comprises a DeepCut neural network as described in Rajchl, which is incorporated herein by reference above. In this example, the segmentation neural network 500 comprising the DeepCut neural network includes a model size of about 9.8 megabytes. In another example, the segmentation neural network 500 comprising the DeepLabv3 neural network includes a model size of about 305 megabytes. Thus, using the DeepCut neural network (or other smaller models) in the segmentation neural network 500 as opposed to larger models, one or more embodiments of the object segmentation system 110 reduce consumption of computer resources (e.g., memory) on implementing client devices. Moreover, in some embodiments, smaller models (e.g., the DeepCut neural network) in the segmentation neural network 500 can provide the same or similar IoU scores as larger models.

Albeit not illustrated in FIG. 5, one or more embodiments of the object segmentation system 110 utilize a different architecture for the segmentation neural network 500. For example, in some embodiments, the segmentation neural network 500 comprises a single encoder block instead of separate first and second encoder branches 510, 514. Similarly, in some embodiments, the segmentation neural network 500 comprises a single set of feature vectors (e.g., a combination, concatenation, or grouping of the first and second sets of feature vectors 512, 516).

Figure 6:
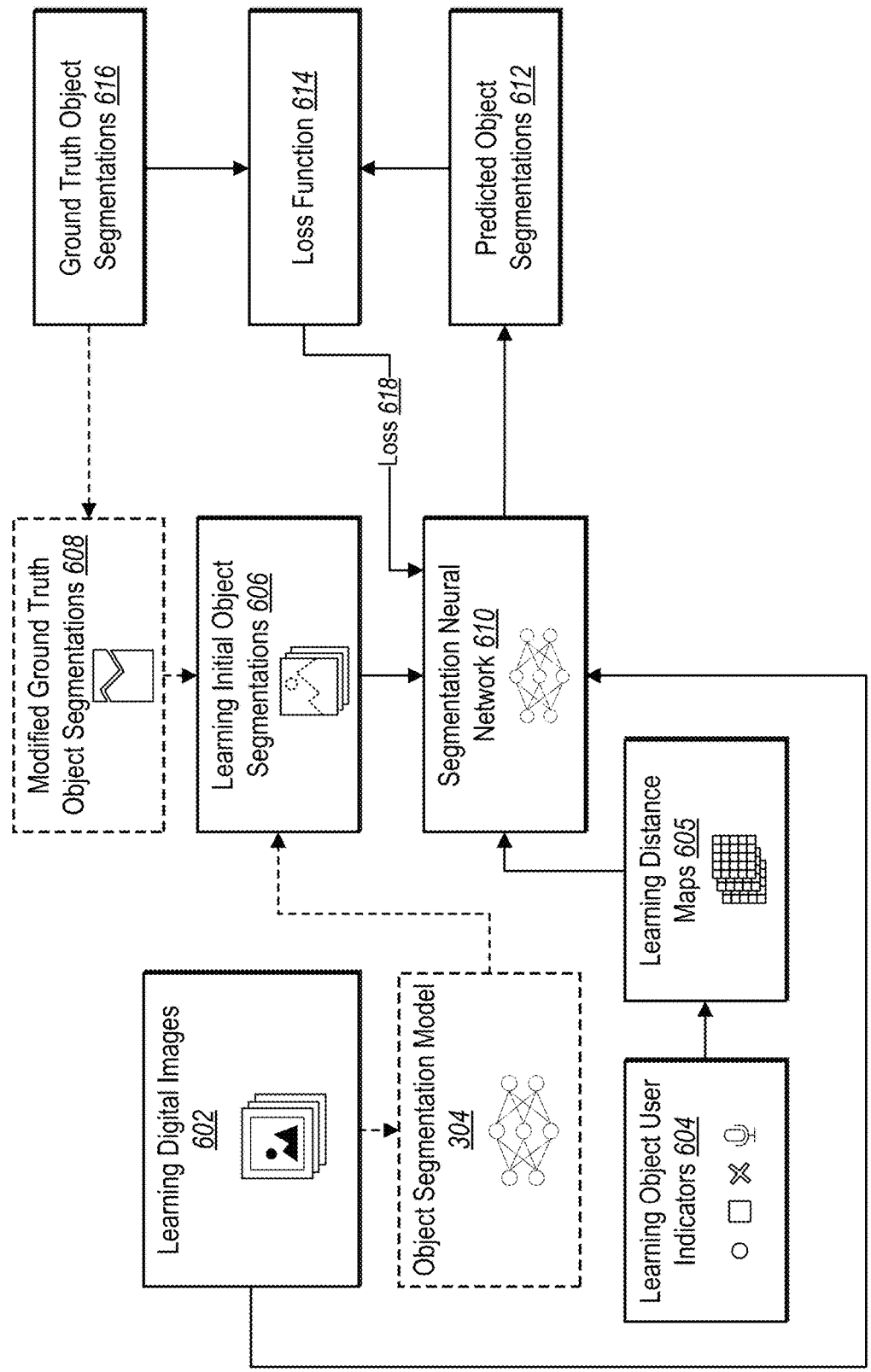
FIG. 6 illustrates an object segmentation system training a segmentation neural network in accordance with one or more embodiments.

As discussed above, one or more embodiments of the object segmentation system 110 train a segmentation neural network to generate an updated object segmentation with improved accuracy and system efficiencies. FIG. 6 illustrates the object segmentation system 110 training a segmentation neural network 610 in accordance with one or more embodiments. The term learning or training is used as a modifier to describe information used to tune or teach a neural network. Thus, for example, the term learning digital image refers to a digital image used to train a neural network. In addition, the term learning object user indicator refers to an input corresponding to one or more input modalities utilized to train a neural network (e.g., input for training that approximates user input corresponding to input modalities). In particular, a learning object user indicator can include or indicate a first position (e.g., pixel or collection of pixels in a digital image) relative to a learning object portrayed in a learning digital image. Moreover, a learning object refers to an object portrayed in a learning digital image. Similarly, a learning initial object segmentation refers to an initial object segmentation of a learning object in a learning digital image.

As shown in FIG. 6, the object segmentation system 110 generates predicted object segmentations 612 by processing a combination of learning digital images 602, learning distance maps 605, and learning initial object segmentations 606 utilizing the segmentation neural network 610 (e.g., the segmentation neural network 212, segmentation neural network 500).

With respect to the learning digital images 602, in one or more embodiments, the object segmentation system 110 samples one or more images from any of a variety of image datasets (e.g., panoptic images). For instance, the learning digital images 602 include a number of images with one or more objects (animate and/or inanimate) in foreground, background, or both. Additionally, in some embodiments, the learning digital images 602 comprises metadata (e.g., labels, tags, etc.). Based on the sampled images acquired for the learning digital images 602, the object segmentation system 110 provides the learning digital images 602 to the segmentation neural network 610.

Further, in some embodiments, the object segmentation system 110 provides the learning digital images 602 to the object segmentation model 304 for generating the learning initial object segmentations 606. Utilizing the learning digital images 602, the object segmentation model 304 generates the learning initial object segmentations 606 in a same or similar manner as described above in relation to FIG. 3A. For example, in certain embodiments, the object segmentation model 304 is a salient object segmentation neural network that analyzes the learning digital images 602 to correspondingly generate the learning initial object segmentations 606.

In other embodiments, the object segmentation system 110 generates the learning initial object segmentations 606 based on modified ground truth object segmentations 608. To generate the modified ground truth object segmentations 608, one or more embodiments of the object segmentation system 110 modifies ground truth object segmentations 616 by altering pixels corresponding to the learning digital images 602. For example, the object segmentation system 110 generates the modified ground truth object segmentations 608 by performing one or more morphological operations to corrupt/distort the ground truth object segmentations 616, such as removing pixels, adding pixels, distorting pixels, shifting pixels, etc. Subsequently, one or more embodiments of the object segmentation system 110 provide the learning initial object segmentations 606 to the segmentation neural network 610 as the modified ground truth object segmentations 608. By using the modified ground truth object segmentations 608 as the learning initial object segmentations 606, certain implementations of the object segmentation system 110 train the segmentation neural network 610 to learn to correct various morphological inaccuracies. For example, the segmentation neural network 610 learns to add excluded pixels, remove prior-included pixels, return shifted/distorted pixels to their original state, etc.

With respect to the learning object user indicators 604, one or more embodiments of the object segmentation system 110 generate the learning object user indicators 604 by performing one or more sampling methods. For example, in some embodiments, the object segmentation system 110 samples learning object user indicators that are within target objects, within a threshold distance to a target object, etc. Additionally or alternatively, the object segmentation system 110 samples learning object user indicators corresponding only to a first input modality (e.g., only positive user indicators), only a second input modality (e.g., only negative user indicators), or a combination of both the first and the second input modalities. These and other sampling methods for generating the learning object user indicators 604 are described in additional detail in Price, which is incorporated by reference above.

Using the learning object user indicators 604, the object segmentation system 110 generates the learning distance maps 605 (e.g., in a same or similar manner as described above in relation to FIG. 4). For example, in some embodiments, the object segmentation system 110 generates a first learning distance map for a first learning object user indicator (e.g., a positive object user indicator), and a second learning distance map for a second learning object user indicator (e.g., a negative object user indicator). In this example, the first learning distance map comprises distance values between pixels of a learning image and the first learning object user indicator. Similarly, the second learning distance map comprises distance values between the pixels of the learning image and the second learning object user indicator.

Based on the learning digital images 602, the learning distance maps 605, and the learning initial object segmentations 606, the object segmentation system 110 generates the predicted object segmentations 612 for comparing with the ground truth object segmentations 616. The term ground truth refers to/includes actual data, observed data, or labeled data. Thus, for instance, a ground truth object segmentation refers to an object segmentation that is previously identified as an actual object segmentation or a correct object segmentation. To illustrate, in some embodiments, the ground truth object segmentations 616 are paired with the learning digital images 602. For example, the image datasets used to obtain the learning digital images 602 may include corresponding ground truth data in the form of the ground truth object segmentations 616. In other embodiments, the object segmentation system 110 generates or otherwise obtains the ground truth object segmentations 616 for the learning digital images 602.

To compare the predicted object segmentations 612 and the ground truth object segmentations 616, the object segmentation system 110 utilizes a loss function 614. In some embodiments, the loss function 614 includes a regression loss function (e.g., a mean square error function, a quadratic loss function, an L2 loss function, a mean absolute error/L1 loss function, mean bias error, etc.). Additionally or alternatively, the loss function 614 includes a classification loss function (e.g., a hinge loss/multi-class SVM loss function, cross entropy loss/negative log likelihood function, etc.).

In particular, the loss function 614 generates a loss 618 comprising quantifiable data (e.g., probability values, confidence scores, etc.) regarding the difference between the predicted object segmentations 612 and the ground truth object segmentations 616. In these or other embodiments, the object segmentation system 110 utilizes the loss 618 to adjust various parameters to improve the quality/accuracy of a predicted object segmentation in subsequent training iterations—by narrowing the measure of loss (and narrowing the difference between the predicted object segmentation and ground truth object segmentations).

As mentioned above, one or more embodiments of the object segmentation system 110 can generate and provide various user interfaces for display on a client device. FIGS. 7A-7D illustrate the object segmentation system 110 providing user interfaces 702a-702d on a computing device 700 in accordance with one or more embodiments. In particular, the user interfaces 702a-702d include a digital image 704 that depict objects 706, 708, and 710. Specifically, as shown in FIG. 7A, the user interface 702a includes a positive user indicator 712 generated in response to the object segmentation system 110 identifying a user input corresponding to an input modality for positive user indicators. In particular, the object segmentation system 110 generates the positive user indicator 712 at a torso section of the object 708 depicted in the digital image 704 (e.g., in accordance with the detected user input at the particular location of the torso section of the object 708).

Figure 7B:
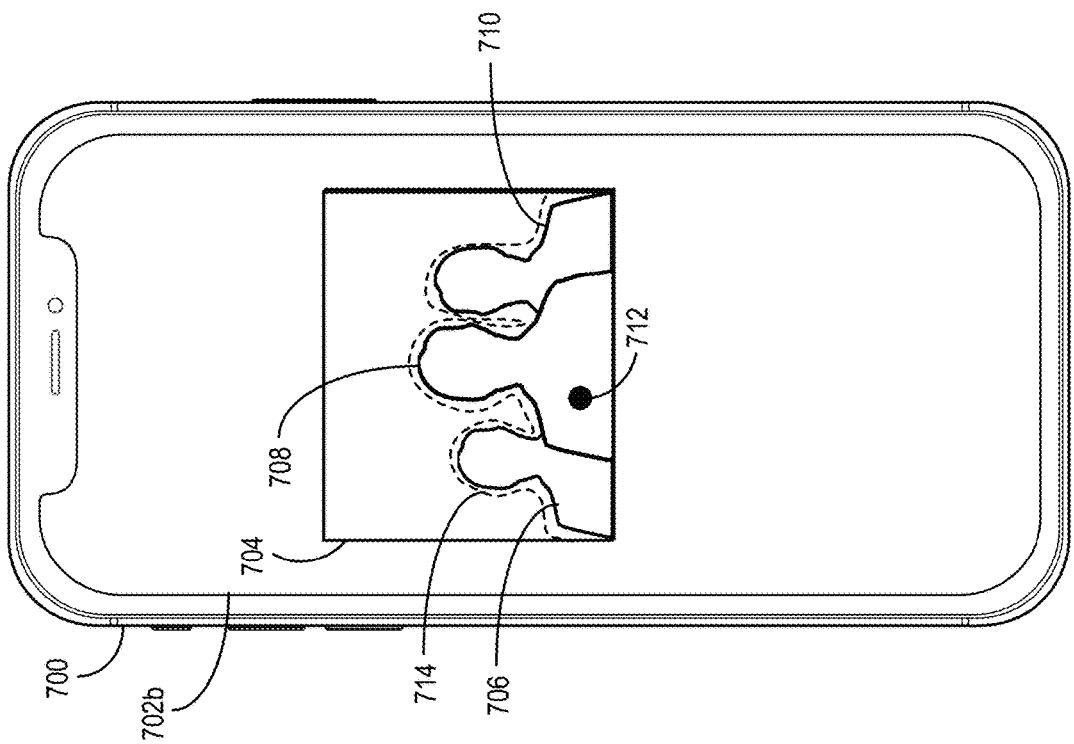
FIGS. 7A-7D illustrate an object segmentation system providing user interfaces on a computing device in accordance with one or more embodiments.
Figure 7A:
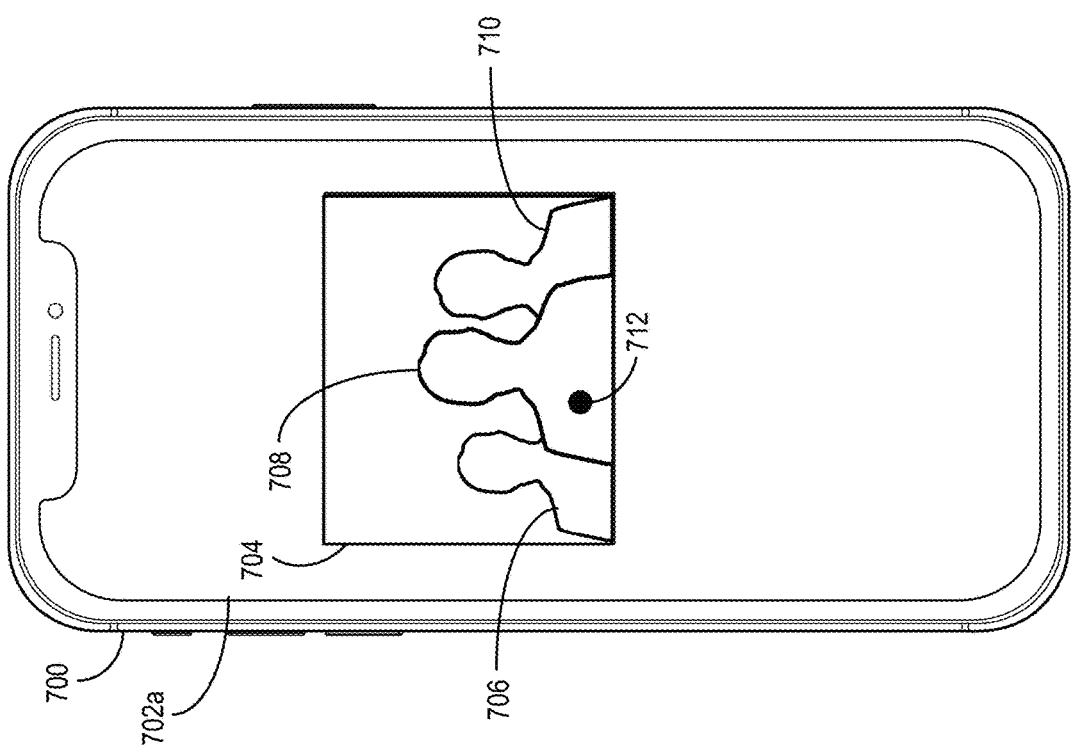

As shown in FIG. 7B, the object segmentation system 110 generates an initial object segmentation 714 in response to the provided positive user indicator 712. In particular, the user interface 702b shows that the initial object segmentation 714 includes each of the objects 706, 708, and 710. In this example, the initial object segmentation 714 is overinclusive by including the object 706 and the object 710 in the initial object segmentation 714.

Although FIG. 7B illustrates the initial object segmentation 714 generated in response to the provided positive user indicator 712, other embodiments of the object segmentation system 110 generate the initial object segmentation 714 utilizing different methods. For example, in some embodiments, the object segmentation system 110 generates the initial object segmentation 714 based on other user inputs (e.g., tracing inputs from a Lasso drawing tool). For example, the object segmentation system 110 can receive user input of a box surrounding the object 708, a boundary edge selection (e.g., a click along a boundary of the object 708), or some other input. In yet another example, the object segmentation system 110 generates the initial object segmentation 714 utilizing automated or semi-automated segmentation methods as described above (e.g., a salient object segmentation neural network). Accordingly, the object segmentation system 110 can generate the initial object segmentation 714 in a variety of different ways described in the present disclosure.

Figure 7D:
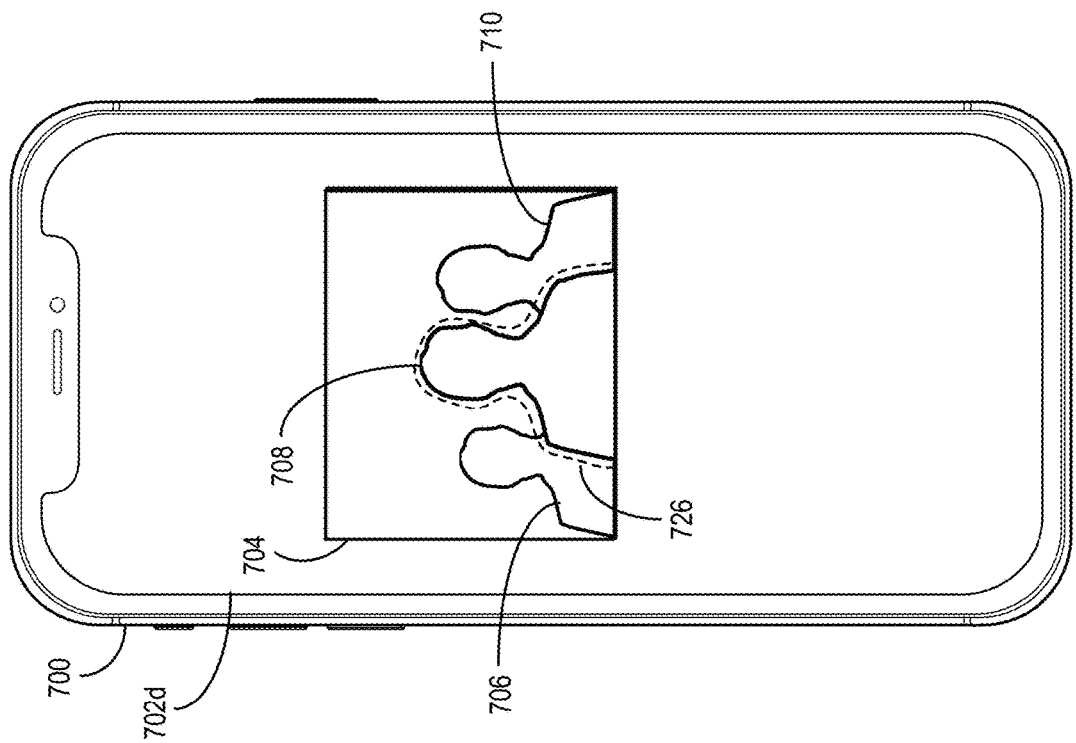
Figure 7C:
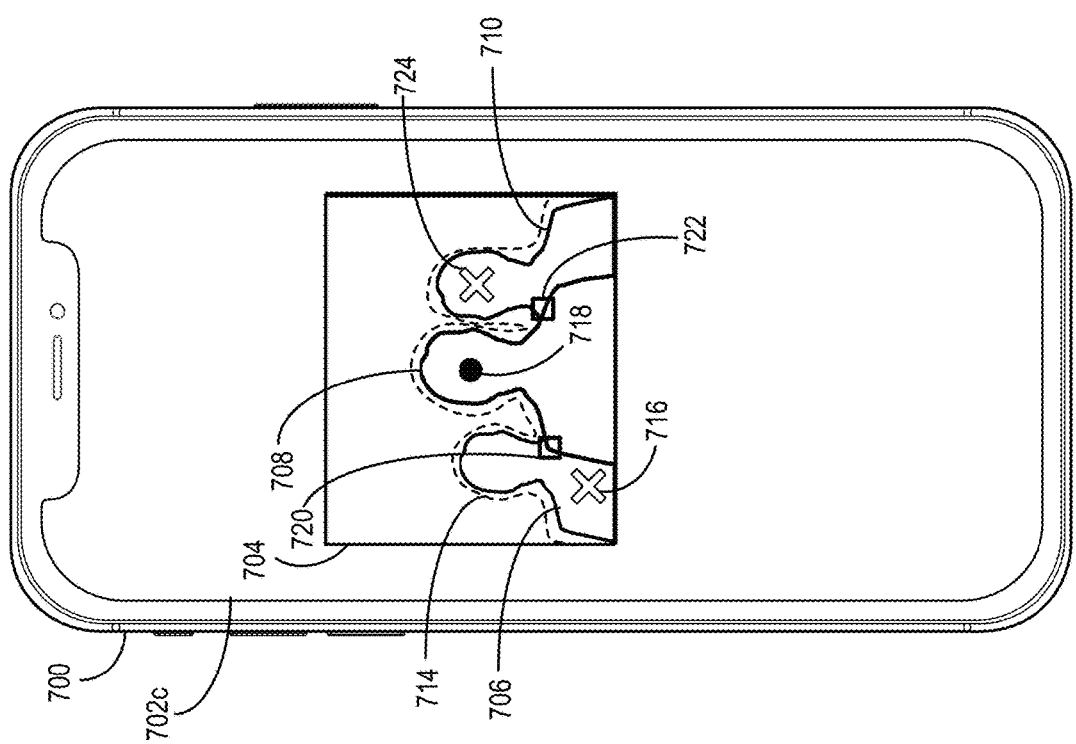

To correct the initial object segmentation 714, FIG. 7C shows the object segmentation system 110 generating additional object user indicators responsive to user input. In particular, the user interface 702c depicts a negative user indicator 716, a positive user indicator 718, boundary user indicators 720-722, and a negative user indicator 724.

Based on these additional object user indicators, the object segmentation system 110 generates corresponding distance maps. For example, the object segmentation system 110 generates a respective distance map for each of the negative user indicator 716, the positive user indicator 718, the boundary user indicators 720-722, and the negative user indicator 724.

Subsequently, the object segmentation system 110 processes the generated distance maps in combination with the digital image 704 and the initial object segmentation 714 (e.g., as an image-interaction-segmentation triplet). Based on the processing the image-interaction-segmentation triplet (e.g., via a segmentation neural network), the object segmentation system 110 generates an updated object segmentation 726. As shown in the user interface 702d of FIG. 7D, the updated object segmentation 726 removes the object 706 and the object 710 (and introduces no additional errors).

In additional or alternative embodiments, the object segmentation system 110 analyzes more or fewer object user indicators to generate the updated object segmentation 726 in FIG. 7D. For example, because the object segmentation system 110 accounts for the initial object segmentation 714 in generating the updated object segmentation 726, in some implementations at the positive user indicator 718 is not needed to generate the updated object segmentation 726.

Additionally or alternatively, in some implementations the negative user indicators 716, 724 are unnecessary. For example, the positions of the boundary user indicators 720, 722 inform the object segmentation system 110 that the updated object segmentation 726 should correspond to the newly identified boundaries between the objects 706, 710. Similarly, in some implementations, the boundary user indicators 720, 722 are unnecessary in view of the negative user indicators 716, 724. Accordingly, accounting for the context of the initial object segmentation 714 provides increased user and system efficiencies (e.g., by reducing a number of user interactions needed to accurately generate the updated object segmentation 726).

Figure 8:
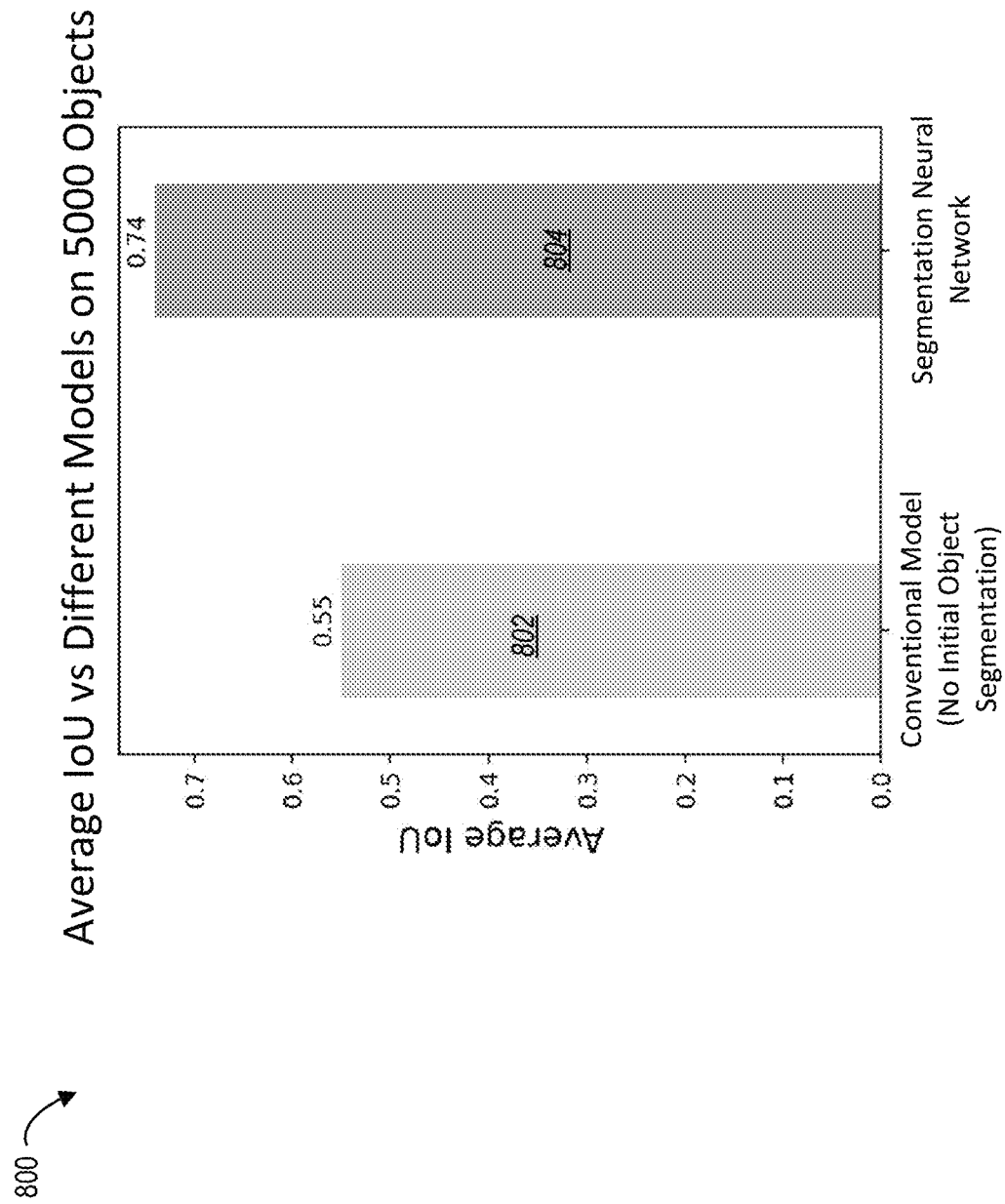
FIG. 8 illustrates experimental results from implementing the object segmentation system in accordance with one or more embodiments.

As mentioned above, the object segmentation system 110 can more flexibly and more accurately generate updated object segmentations. FIG. 8 illustrates experimental results from implementing the object segmentation system 110 in accordance with one or more embodiments. As shown, FIG. 8 depicts a graph 800 with performance bars 802-804 indicating average intersection over union ("IOU") scores corresponding to respective models for segmenting objects (e.g., 5,000 objects) portrayed in a test dataset of digital images. In particular, the performance bar 802 shows that a model that does not process an initial object segmentation provides an average IoU score of 0.55.

Further, the performance bar 804 shows another segmentation neural network of the object segmentation system 110 that provides an average IoU score of about 0.74 for the test dataset. Providing an almost 26% improvement in IoU over a conventional model, the performance bar 806 shows that the object segmentation system 110 provides a substantial accuracy improvement for generating an updated object segmentation based on an image-interaction-segmentation triplet. As mentioned above, the object segmentation system 110 can achieve IoU scores of 0.74 or above using larger models or smaller models (e.g., the DeepCut neural network).

Figure 9B:
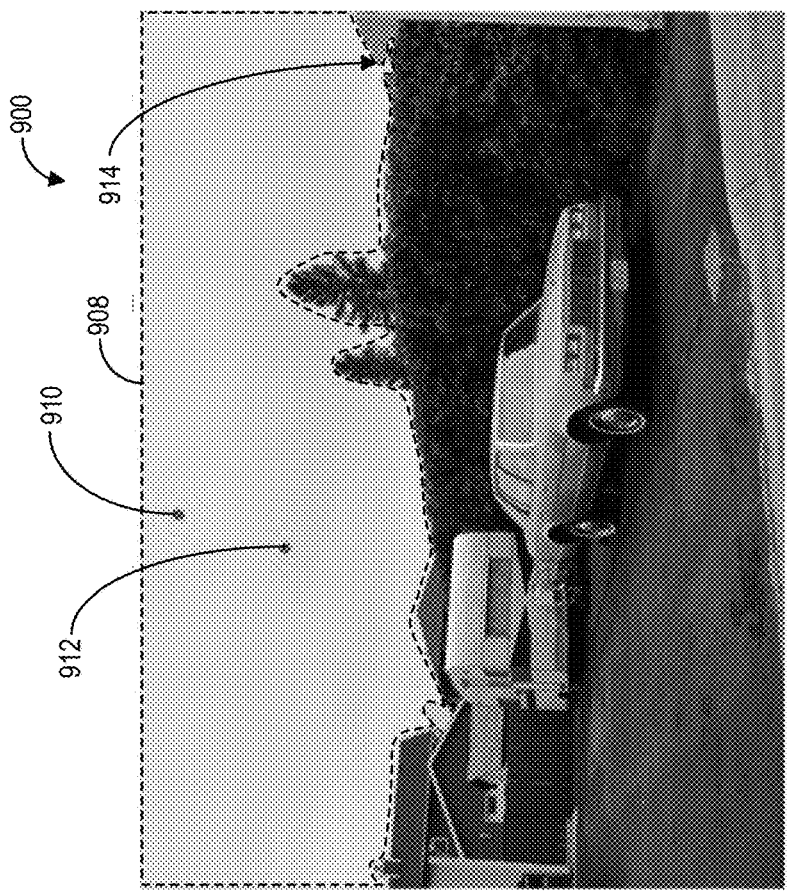
FIGS. 9A-9C illustrate object segmentations generated by a conventional system and the object segmentation system in accordance with one or more embodiments.
Figure 9A:
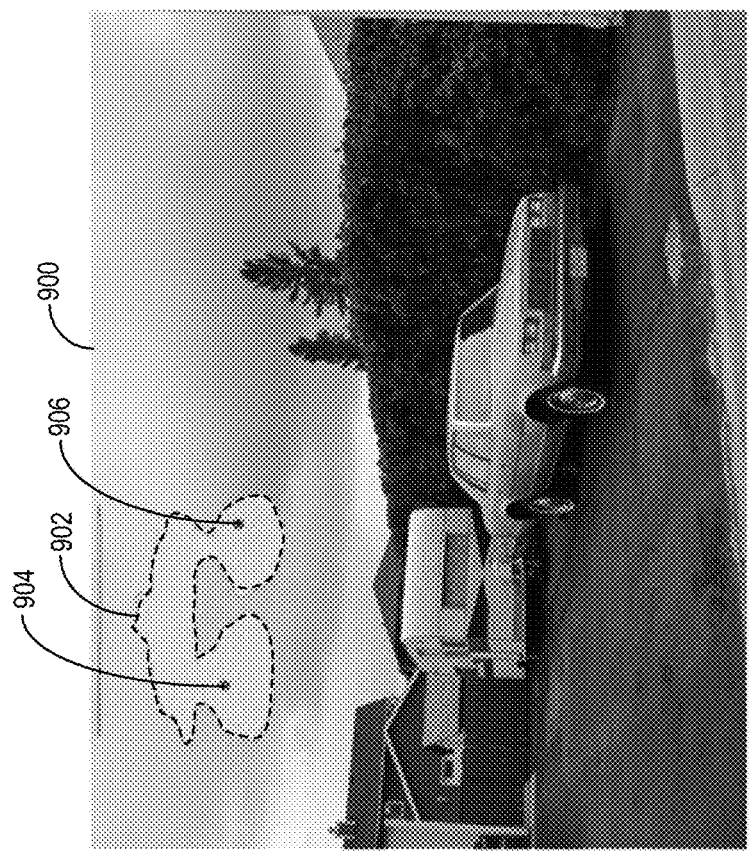
Figure 9C:
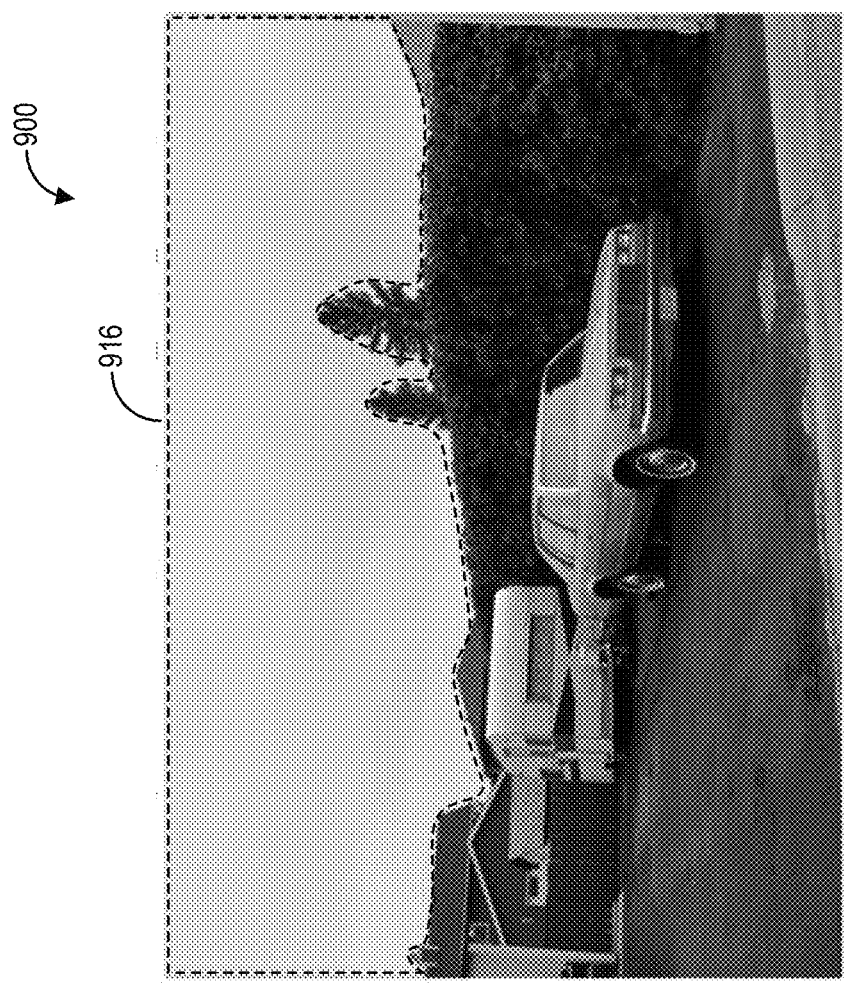

As discussed above, the object segmentation system 110 can provide improved accuracy of object segmentations over conventional systems. FIGS. 9A-9C illustrate respective object segmentations provided by a conventional system relative to the object segmentation system 110 in accordance with one or more embodiments. As shown in FIG. 9A, a conventional system analyzes a digital image 900 to generate an object segmentation 902 based on user input 904, 906. In attempts to select the background sky in the digital image 900, the conventional system generates the updated object segmentation 902 with an IoU score of 10.76% relative to a ground truth object segmentation 916 of the digital image 900 in FIG. 9C.

In contrast, FIG. 9B shows the object segmentation system 110 generating an updated object segmentation 908 based on object user indicators 910, 912. In particular embodiments, the object segmentation system 110 analyzes the object user indicators 910, 912 to generate respective distance maps based on the object user indicators 910, 912. Subsequently, in some embodiments, the object segmentation system 110 generates an image-interaction-segmentation triplet by combining color channels of the digital image 900, the distance maps, and an initial object segmentation (not shown). By processing the image-interaction-segmentation triplet using a segmentation neural network as disclosed herein, the object segmentation system 110 generates the updated object segmentation 908 with an IoU score of 98.49%. Indeed, as shown in FIG. 9B, the updated object segmentation 908 includes only a minor discrepancy 914 in comparison to the ground truth object segmentation 916 of FIG. 9C. Accordingly, the object segmentation system 110 can generate updated object segmentations with significant accuracy gains over conventional systems.

Figure 10:
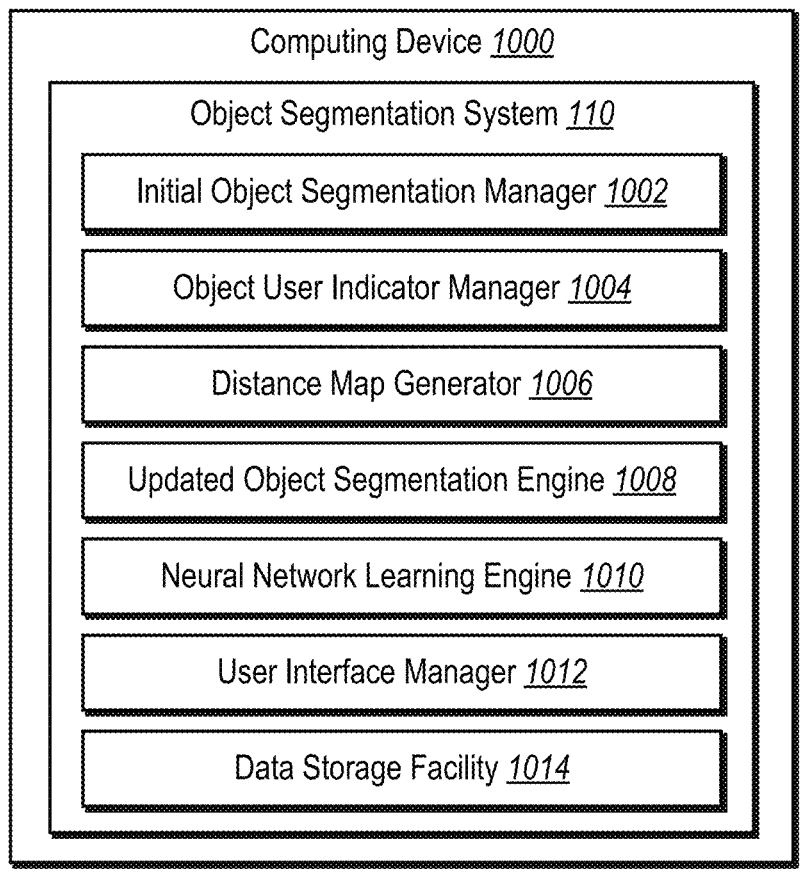
FIG. 10 illustrates an example schematic diagram of an object segmentation system in accordance with one or more embodiments.

Turning to FIG. 10, additional detail will now be provided regarding various components and capabilities of the object segmentation system 110. In particular, FIG. 10 illustrates an example schematic diagram of a computing device 1000 (e.g., the server(s) 102, the client device 106, and/or the computing device 700) implementing the object segmentation system 110 in accordance with one or more embodiments of the present disclosure. As shown, the object segmentation system 110 in one or more embodiments includes an initial object segmentation manager 1002, an object user indicator manager 1004, a distance map generator 1006, an updated object segmentation engine 1008, a neural network learning engine 1010, a user interface manager 1012, and a data storage facility 1014.

In one or more embodiments, the initial object segmentation manager 1002 generates, obtains, transmits, and/or stores initial object segmentations (as described in relation to the foregoing figures). In particular embodiments, the initial object segmentation manager 1002 utilizes an object segmentation model (e.g., a salient object segmentation neural network) to automatically generate an object segmentation of one or more objects portrayed in a digital image. In other embodiments, the initial object segmentation manager 1002 identifies user interactions to interactively segment one or more objects portrayed in a digital image.

In one or more embodiments, the object user indicator manager 1004 generates or identifies object user indicators in response to user interaction (e.g., to correct an initial object segmentation as described in relation to the foregoing figures). In particular embodiments, the object user indicator manager 1004 identifies a first object user indicator (e.g., a positive user indicator) and corresponding location within a digital image in response to a user input with respect to a first portion of the digital image. Additionally, in some embodiments, the object user indicator manager 1004 identifies a second object user indicator (e.g., a negative user indicator) and corresponding location within the digital image in response to a user input with respect to a second portion of the digital image.

In one or more embodiments, the distance map generator 1006 generates distance maps based on object user indicators (e.g., as described in relation to the foregoing figures). In particular embodiments, the distance map generator 1006 generates a first distance map based on distances between pixels of the digital image and the first object user indicator. Additionally, in some embodiments, the distance map generator 1006 generates a second distance map based on distances between pixels of the digital image and the second object user indicator.

In one or more embodiments, the updated object segmentation engine 1008 generates an updated object segmentation (as described in relation to the foregoing figures). In particular embodiments, the updated object segmentation engine 1008 generates the updated object segmentation by processing the digital image, the distance map(s), and the initial object segmentation utilizing a segmentation neural network. For example, in comparison to the initial object segmentation, the updated object segmentation engine 1008 generates the updated object segmentation to include a selection of one or more additional or alternative pixels corresponding to the digital image.

In one or more embodiments, the neural network learning engine 1010 teaches, guides, tunes, and/or trains one or more neural networks. In particular embodiments, the neural network learning engine 1010 trains a segmentation neural network based on a plurality of learning digital images. Moreover, in one or more embodiments, the neural network learning engine 1010 generates learning distance maps based on learning object user indicators identified with respect to the plurality of learning digital images. Additionally, in some embodiments, the neural network learning engine 1010 generates learning initial object segmentations by utilizing an object segmentation model or by utilizing modified ground truth object segmentations. Based on predicted object segmentations from the segmentation neural network, one or more embodiments of the neural network learning engine 1010 compare predicted object segmentations and ground truth object segmentations to generate a loss utilizing a loss function. By applying the loss to the segmentation neural network, one or more embodiments of the neural network learning engine 1010 update one or more parameters of the segmentation neural network.

The user interface manager 1012 in one or more embodiments provides, manages, and/or controls a graphical user interface (or simply "user interface"). In particular embodiments, the user interface manager 1012 generates and displays a user interface by way of a display screen composed of a plurality of graphical components, objects, and/or elements that allow a user to perform a function. For example, the user interface manager 1012 receives user inputs from a user, such as a click/tap to provide an object user indicator with respect to a portion of a digital image. Additionally, the user interface manager 1012 in one or more embodiments presents a variety of types of information, including text, digital media items, object segmentations, or other information for presentation in a user interface.

The data storage facility 1014 maintains data for the object segmentation system 110. The data storage facility 1014 (e.g., via one or more memory devices) maintains data of any type, size, or kind, as necessary to perform the functions of the object segmentation system 110. In particular embodiments, the data storage facility 1014 coordinates storage mechanisms for other components of the computing device 1000 (e.g., for storing an object segmentation model, a segmentation neural network, and/or a digital image portraying an object, etc.).

Each of the components of the computing device 1000 can include software, hardware, or both. For example, the components of the computing device 1000 can include one or more instructions stored on a computer-readable storage medium and executable by processors of one or more computing devices, such as a client device or server device. When executed by the one or more processors, the computer-executable instructions of the object segmentation system 110 can cause the computing device(s) (e.g., the computing device 1000) to perform the methods described herein. Alternatively, the components of the computing device 1000 can include hardware, such as a special-purpose processing device to perform a certain function or group of functions. Alternatively, the components of the computing device 1000 can include a combination of computer-executable instructions and hardware.

Furthermore, the components of the computing device 1000 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1000 may be implemented as a stand-alone application, such as a desktop or mobile application. Furthermore, the components of the computing device 1000 may be implemented as one or more web-based applications hosted on a remote server.

The components of the computing device 1000 may also be implemented in a suite of mobile device applications or "apps." To illustrate, the components of the computing device 1000 may be implemented in an application, including but not limited to ILLUSTRATOR®, ADOBE FRESCO®, PHOTOSHOP®, LIGHTROOM®, ADOBE® XD, or AFTER EFFECTS®. Product names, including "ADOBE" and any other portion of one or more of the foregoing product names, may include registered trademarks or trademarks of Adobe Inc. in the United States and/or other countries.

Figure 11:
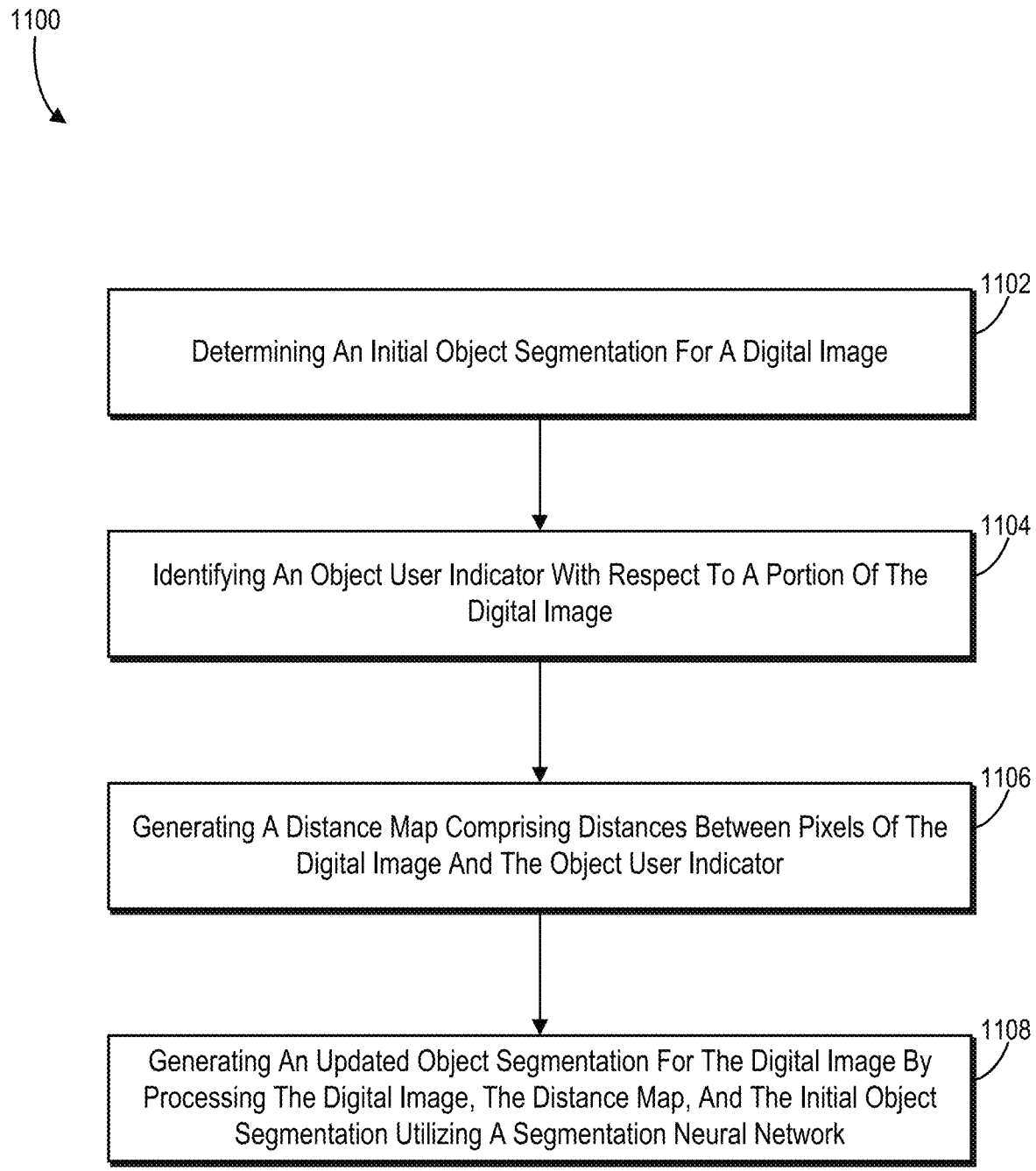
FIG. 11 illustrates a flowchart of a series of acts for generating an updated object segmentation in accordance with one or more embodiments.

FIGS. 1-10, the corresponding text, and the examples provide several different systems, methods, techniques, components, and/or devices of the object segmentation system 110 in accordance with one or more embodiments. In addition to the above description, one or more embodiments can also be described in terms of flowcharts including acts for accomplishing a particular result. For example, FIG. 11 illustrates a flowchart of a series of acts 1100 for generating an updated object segmentation in accordance with one or more embodiments. The object segmentation system 110 may perform one or more acts of the series of acts 1100 in addition to or alternatively to one or more acts described in conjunction with other figures. While FIG. 11 illustrates acts according to one embodiment, alternative embodiments may omit, add to, reorder, and/or modify any of the acts shown in FIG. 11. For example, in some embodiments, the acts illustrated in FIG. 11 are applied iteratively such that the output of the act 1108 is fed as input to a subsequent application of the act 1102. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown, the series of acts 1100 includes an act 1102 of determining an initial object segmentation for a digital image. In some embodiments, determining the initial object segmentation for the digital image comprises utilizing an object segmentation model (e.g., a salient object segmentation neural network) to segment an object portrayed in the digital image. In other embodiments, act 1102 comprises identifying a user selection of an object portrayed in the digital image. For example, the object segmentation system 110 provides the digital image for display within a user interface of a client device. Then, in certain embodiments, act 1102 comprises determining the initial object segmentation for the digital image based on user interaction via the user interface to interactively segment an object portrayed in the digital image. Moreover, in one or more embodiments, act 1102 comprises determining the initial object segmentation for the digital image by generating one of a binary segmentation mask or a probability map.

In addition, the series of acts 1100 comprises an act 1104 of identifying an object user indicator with respect to a portion of the digital image. In some embodiments, act 1104 comprises identifying a first object user indicator with respect to a first portion of the digital image corresponding to a foreground of the digital image. Additionally, in some embodiments, act 1104 comprises identifying a second object user indicator with respect to a second portion of the digital image corresponding to a background of the digital image.

Further, the series of acts 1100 includes an act 1106 of generating a distance map comprising distances between pixels of the digital image and the object user indicator. In some embodiments, act 1106 comprises generating the distance map by generating a first distance map using the first object user indicator and generating a second distance map using the second object user indicator. In particular embodiments, act 1106 comprises generating the distance map by generating a positive distance map corresponding to a positive user indicator and generating a negative distance map corresponding to a negative user indicator.

In addition, the series of acts 1100 further includes an act 1108 of generating an updated object segmentation for the digital image by processing the digital image, the distance map, and the initial object segmentation utilizing a segmentation neural network. In these or other embodiments, the updated object segmentation comprises a selection of one or more additional or alternative pixels corresponding to the digital image. In some embodiments, act 1108 comprises generating the updated object segmentation for the digital image by: generating a probability map by processing the digital image, the distance map, and the initial object segmentation utilizing the segmentation neural network; and generating the updated object segmentation by processing the probability map utilizing a graph cut algorithm.

In some embodiments, act 1108 comprises generating the updated object segmentation for the digital image by processing the first distance map, the second distance map, and the initial object segmentation utilizing the segmentation neural network. In particular embodiments, act 1108 comprises generating the updated object segmentation for the digital image by processing the positive distance map, the negative distance map, and the initial object segmentation utilizing the segmentation neural network.

In one or more embodiments, act 1108 comprises generating the updated object segmentation for the digital image by: generating an image-interaction-segmentation triplet by combining (e.g., concatenating) the distance map, the initial object segmentation, and one or more color channels for the digital image; and processing the image-interaction-segmentation triplet utilizing the segmentation neural network.

In some embodiments, act 1108 comprises generating the updated object segmentation for the digital image by: prior to identifying the object user indicator, generating a first set of feature vectors by processing the digital image and the initial object segmentation utilizing a first branch of an encoder of the segmentation neural network; upon identifying the object user indicator, generating a second set of feature vectors by processing the object user indicator in a second branch of the encoder of the segmentation neural network; and generating the updated object segmentation by processing the first set of feature vectors and the second set of feature vectors utilizing a decoder of the segmentation neural network.

It is understood that the outlined acts in the series of acts 1100 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 11, act(s) in the series of acts 1100 may include an act of learning parameters for the segmentation neural network by: generating a predicted object segmentation by processing a learning digital image, a learning object user indicator, and a learning initial object segmentation utilizing the segmentation neural network; and modifying the parameters for the segmentation neural network based on comparing the predicted object segmentation and a ground truth object segmentation utilizing a loss function.

Similarly, another example of an additional act not shown in FIG. 11, act(s) in the series of acts 1100 may include an act of learning parameters for the segmentation neural network by: generating a learning initial object segmentation utilizing the object segmentation model; generating a predicted object segmentation by processing the digital image, a learning object user indicator, and the learning initial object segmentation utilizing the segmentation neural network; and modifying the parameters by comparing the predicted object segmentation and a ground truth object segmentation utilizing a loss function.

As another example of an act not shown in FIG. 11, act(s) in the series of acts 1100 may include an act of generating the learning initial object segmentation by: modifying the ground truth object segmentation to add or subtract one or more pixels corresponding to the digital image; or processing the learning digital image utilizing an object segmentation model.

In yet another example of an act not shown in FIG. 11, act(s) in the series of acts 1100 may include an act of: providing, for display within a user interface of a client device, the digital image and the initial object segmentation; and/or providing, for display within the user interface of the client device, the updated object segmentation.

As just mentioned, in one or more embodiments, act(s) the series of acts 1100 include performing a step for generating an updated object segmentation for the digital image based on the digital image, the object user indicator, and the initial object segmentation. For instance, the acts and algorithms described above in relation to FIGS. 2 and 3A-3B can comprise the corresponding acts (or structure) for performing a step for generating an updated object segmentation for the digital image based on the digital image, the object user indicator, and the initial object segmentation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
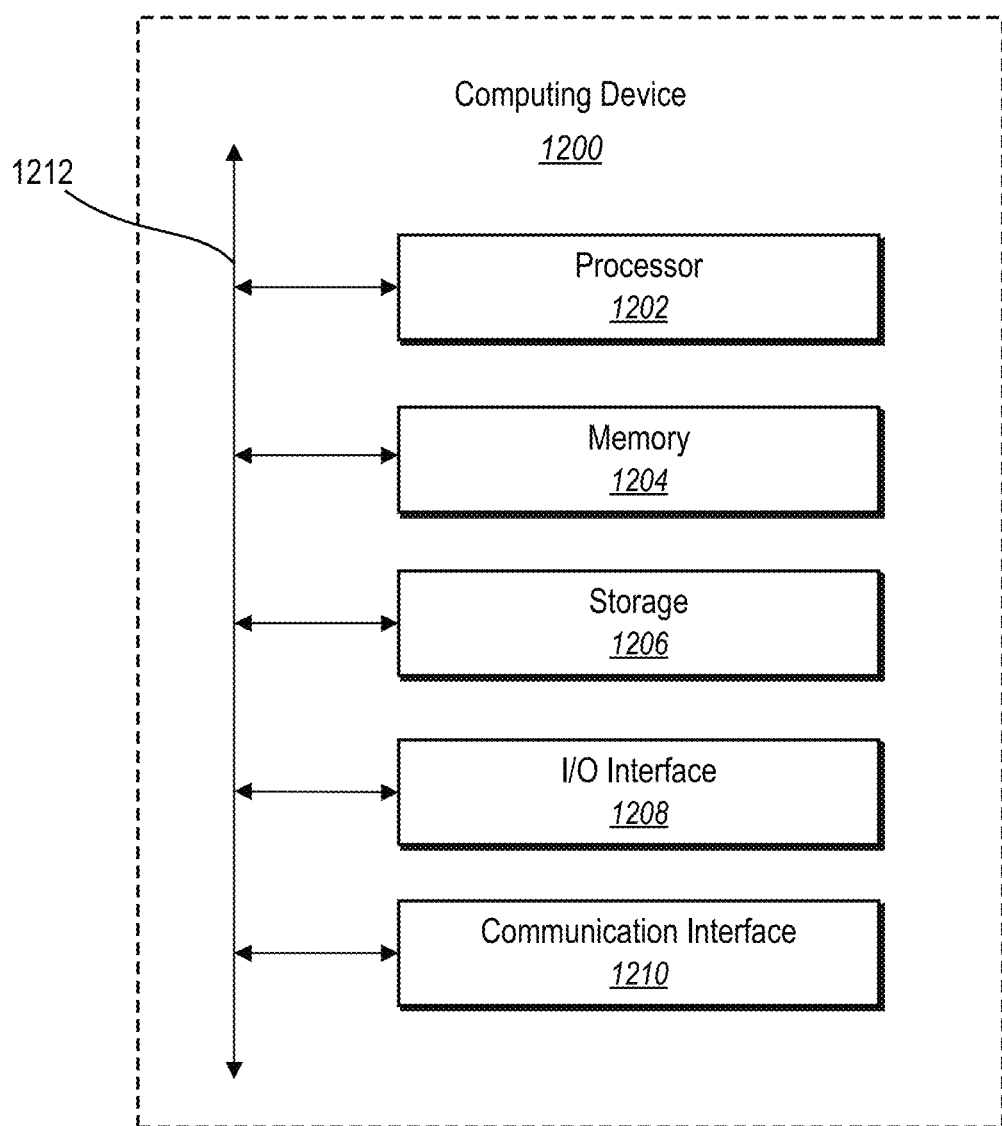
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, the client device 106, the computing device 700, and/or the computing device 1000). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of the computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   determine an initial object segmentation for a digital image;
   generate, utilizing a first encoder of a segmentation neural network, a first set of feature vectors from the initial object segmentation and the digital image;
   identify an object user indicator with respect to a portion of the digital image;
   generate a distance map comprising distances between pixels of the digital image and the object user indicator;

generate, utilizing a second encoder of the segmentation neural network, a second set of feature vectors from the distance map; and generate, utilizing a decoder of the segmentation neural network, an updated object segmentation for the digital image from the first set of feature vectors and the second set of feature vectors.

2. The non-transitory computer-readable medium of claim 1, further comprising instructions that, when executed by the at least one processor, cause the computing device to determine the initial object segmentation for the digital image by utilizing an object segmentation model to segment an object portrayed in the digital image.

3. The non-transitory computer-readable medium of claim 1, further comprising instructions that, when executed by the at least one processor, cause the computing device to:

provide the digital image for display within a user interface of a client device; and determine the initial object segmentation for the digital image based on user interaction via the user interface to interactively segment an object portrayed in the digital image.

4. The non-transitory computer-readable medium of claim 1, further comprising instructions that, when executed by the at least one processor, cause the computing device to determine the initial object segmentation for the digital image by generating one of a binary segmentation mask or a probability map.

5. The non-transitory computer-readable medium of claim 1, further comprising instructions that, when executed by the at least one processor, cause the computing device to:

identify a first object user indicator with respect to a first portion of the digital image corresponding to a foreground of the digital image; and identify a second object user indicator with respect to a second portion of the digital image corresponding to a background of the digital image.

6. The non-transitory computer-readable medium of claim 5, further comprising instructions that, when executed by the at least one processor, cause the computing device to:

generate the distance map by generating a first distance map using the first object user indicator and generating a second distance map using the second object user indicator; and generate the second set of feature vectors from the first distance map and the second distance map.

7. The non-transitory computer-readable medium of claim 1, further comprising instructions that, when executed by the at least one processor, cause the computing device to generate the updated object segmentation for the digital image by:

generating a probability map by processing the first set of feature vectors and the second set of feature vectors utilizing the segmentation neural network; and generating the updated object segmentation by processing the probability map utilizing a graph cut algorithm.

8. The non-transitory computer-readable medium of claim 1, further comprising instructions that, when executed by the at least one processor, cause the computing device to generate the updated object segmentation for the digital image by:

generating, utilizing the decoder of the segmentation neural network, an image-interaction-segmentation triplet by combining the first set of feature vectors and the second set of feature vectors; and processing the image-interaction-segmentation triplet utilizing a layer of the decoder of the segmentation neural network.

9. The non-transitory computer-readable medium of claim 1, further comprising instructions that, when executed by the at least one processor, cause the computing device to learn parameters for the segmentation neural network by:

generating a predicted object segmentation by processing a learning digital image, a learning object user indicator, and a learning initial object segmentation utilizing the segmentation neural network; and modifying the parameters for the segmentation neural network based on comparing the predicted object segmentation and a ground truth object segmentation utilizing a loss function.

10. The non-transitory computer-readable medium of claim 9, further comprising instructions that, when executed by the at least one processor, cause the computing device to generate the learning initial object segmentation by:

modifying the ground truth object segmentation to add or subtract one or more pixels corresponding to the digital image; or processing the learning digital image utilizing an object segmentation model.

11. A system comprising:

one or more memory devices comprising an object segmentation model, a segmentation neural network, and a digital image portraying an object; and one or more processors configured to cause the system to:
generate, utilizing the object segmentation model, an initial object segmentation of the object portrayed within the digital image;
generate, utilizing a first encoder of a segmentation neural network, a first set of feature vectors from the initial object segmentation and the digital image;
provide, for display within a user interface of a client device, the digital image and the initial object segmentation;
identify, based on user interaction via the user interface, an object user indicator with respect to a portion of the digital image;
generate a distance map comprising distances between pixels of the digital image and the object user indicator;
generate, utilizing a second encoder of the segmentation neural network, a second set of feature vectors from the distance map;
generate, utilizing a decoder of the segmentation neural network, an updated object segmentation for the digital image from the first set of feature vectors and the second set of feature vectors; and
provide, for display within the user interface of the client device, the updated object segmentation.

12. The system of claim 11, wherein the one or more processors are configured to cause the system to generate the initial object segmentation by processing the digital image utilizing a salient object segmentation neural network.

13. The system of claim 11, wherein the one or more processors are configured to cause the system to:

generate the distance map by generating a positive distance map corresponding to a positive user indicator and generating a negative distance map corresponding to a negative user indicator; and generate the second set of feature vectors from the positive distance map and the negative distance map.

14. The system of claim 11, wherein the one or more processors are configured to cause the system to generate the updated object segmentation for the digital image by:

generating a probability map utilizing the segmentation neural network; and converting the probability map to a binary segmentation mask utilizing a graph cut algorithm.

15. The system of claim 11, wherein the one or more processors are configured to cause the system to generate the updated object segmentation for the digital image by:

generating, utilizing the decoder of the segmentation neural network, an image-interaction-segmentation triplet by combining the first set of feature vectors and the second set of feature vectors; and processing the image-interaction-segmentation triplet utilizing a layer of the decoder of the segmentation neural network.

16. The system of claim 11, wherein the one or more processors are configured to cause the system to generate the first set of feature vectors by:

generating a first portion of the first set of feature vectors by generating a vector representation of color channels of the digital image; and generating a second portion of the first set of feature vectors by generating a vector representation of the initial object segmentation.

17. The system of claim 11, wherein the one or more processors are configured to cause the system to learn parameters for the segmentation neural network by:

generating a learning initial object segmentation utilizing the object segmentation model;

generating a predicted object segmentation by processing the digital image, a learning object user indicator, and the learning initial object segmentation utilizing the segmentation neural network; and modifying the parameters by comparing the predicted object segmentation and a ground truth object segmentation utilizing a loss function.

18. A computer-implemented method comprising:

determining an initial object segmentation for a digital image;

generating, utilizing a first encoder of a segmentation neural network, a first set of feature vectors from the initial object segmentation and the digital image;

providing, for display via a user interface of a client device, the initial object segmentation and the digital image;

identifying an object user indicator with respect to a portion of the digital image;

generating a distance map comprising distances between pixels of the digital image and the object user indicator;

generating, utilizing a second encoder of the segmentation neural network, a second set of feature vectors from the distance map;

generating, utilizing a decoder of the segmentation neural network, an updated object segmentation for the digital image from the first set of feature vectors and the second set of feature vectors; and providing, for display via the user interface, the updated object segmentation and the digital image.

19. The computer-implemented method of claim 18, wherein determining the initial object segmentation for the digital image comprises processing the digital image utilizing a salient object segmentation neural network or identifying a user selection of an object portrayed in the digital image.

20. The computer-implemented method of claim 18, wherein the updated object segmentation comprises a selection of one or more additional or alternative pixels corresponding to the digital image.

* * * * *